United States Patent
Marui et al.

(10) Patent No.: US 11,247,333 B2
(45) Date of Patent: Feb. 15, 2022

(54) WORK DEVICE USING PARALLEL LINK MECHANISM

(71) Applicant: NTN CORPORATION, Osaka (JP)

(72) Inventors: Naoki Marui, Iwata (JP); Hiroshi Isobe, Iwata (JP)

(73) Assignee: NTN CORPORATION, Osaka (JP)

( * ) Notice: Subject to any disclaimer, the term of this patent is extended or adjusted under 35 U.S.C. 154(b) by 156 days.

(21) Appl. No.: 16/809,153

(22) Filed: Mar. 4, 2020

(65) Prior Publication Data

US 2020/0198132 A1 Jun. 25, 2020

Related U.S. Application Data

(63) Continuation of application No. PCT/JP2018/033159, filed on Sep. 7, 2018.

(30) Foreign Application Priority Data

Sep. 8, 2017 (JP) .............................. JP2017-173158
Feb. 26, 2018 (JP) .............................. JP2018-031796

(51) Int. Cl.
 *B25J 9/16* (2006.01)
 *B25J 9/00* (2006.01)
 *B25J 9/12* (2006.01)

(52) U.S. Cl.
 CPC ........... *B25J 9/1651* (2013.01); *B25J 9/0009* (2013.01); *B25J 9/12* (2013.01); *B25J 9/1653* (2013.01); *B25J 9/1674* (2013.01)

(58) Field of Classification Search
 CPC . B25J 9/0009; B25J 9/12; B25J 9/1623; B25J 9/1651; B25J 9/1653; B25J 9/1674
 See application file for complete search history.

(56) References Cited

U.S. PATENT DOCUMENTS

| 4,305,028 A | 12/1981 | Kostas et al. |
| 4,360,886 A | 11/1982 | Kostas et al. |

(Continued)

FOREIGN PATENT DOCUMENTS

| JP | 56-157983 | 12/1981 |
| JP | 3-196982 | 8/1991 |

(Continued)

OTHER PUBLICATIONS

Yun Jiang Lou et al., "Randomized Optimal Design of Parallel Manipulators", IEEE Transactions on Automation Science and Engineering, IEEE Service Center, New York, NY, US, vol. 5, No. 2, Apr. 1, 2008, pp. 223-233**.

(Continued)

*Primary Examiner* — Dale Moyer

(57) ABSTRACT

The parallel link mechanism is applied to a work device in which a link actuation device and a combined-side actuator are combined. A control device includes a storage that stores a plurality of work coordinates as well as a work-point movement velocity as a target velocity of an end effector and a posture change velocity as a target angular velocity to be set for changing the posture of the end effector. A controller includes a switching function unit that switches the target velocity used for calculating movement velocities of the respective posture control actuators and a movement velocity of the combined-side actuator, to the work-point movement velocity and to the posture change velocity.

9 Claims, 25 Drawing Sheets

(56) References Cited

U.S. PATENT DOCUMENTS

| | | |
|---|---|---|
| 7,047,107 B2 | 5/2006 | Kimura et al. |
| 9,394,979 B2 | 7/2016 | Yamada et al. |
| 10,065,310 B2 | 9/2018 | Sakata et al. |
| 10,265,860 B2 | 4/2019 | Ide et al. |
| 2004/0054437 A1 | 3/2004 | Kimura et al. |
| 2005/0146301 A1 | 7/2005 | Ando |
| 2009/0301253 A1* | 12/2009 | Nishida .................. B25J 9/1623 74/490.01 |
| 2012/0060637 A1* | 3/2012 | Kinoshita ............ B25J 17/0283 74/490.03 |
| 2013/0253751 A1 | 9/2013 | Choi et al. |
| 2014/0305244 A1 | 10/2014 | Yamada et al. |
| 2015/0241203 A1 | 8/2015 | Jordil et al. |
| 2016/0052141 A1 | 2/2016 | Ide et al. |
| 2016/0361816 A1 | 12/2016 | Sakata et al. |
| 2019/0366535 A1* | 12/2019 | Sakata ...................... B25J 5/02 |

FOREIGN PATENT DOCUMENTS

| | | |
|---|---|---|
| JP | 8-112792 A | 5/1996 |
| JP | 8-339221 | 12/1996 |
| JP | 2006-116658 | 5/2006 |
| JP | 2010-167515 | 8/2010 |
| JP | 5447811 B2 | 3/2014 |
| JP | 5785055 | 7/2015 |
| JP | 2015-155124 | 8/2015 |
| JP | 2015-188945 | 11/2015 |
| JP | 2016-43452 | 4/2016 |
| WO | WO 02/066210 | 8/2002 |
| WO | WO 2016/084685 | 6/2016 |

OTHER PUBLICATIONS

Extended European Search Report dated May 12, 2021, in corresponding European Patent Application No. 18855066.9.

International Preliminary Report on Patentability dated Mar. 10, 2020, in corresponding International Patent Application No. PCT/JP2018/033159.

International Search Report dated Oct. 23, 2018 in corresponding International Patent Application No. PCT/JP2018/033159.

Japanese Office action dated Dec. 18, 2018, in corresponding Patent Application No. 2017-173158.

\* cited by examiner

WORK DEVICE USING PARALLEL LINK MECHANISM

CROSS REFERENCE TO THE RELATED APPLICATION

This application is a continuation application, under 35 U.S.C. § 111(a) of international patent application No. PCT/JP2018/033159, filed Sep. 7, 2018, which claims priority to Japanese patent application No. 2017-173158, filed Sep. 8, 2017, and Japanese patent application No. 2018-031796, filed Feb. 26, 2018, the entire disclosures of which are herein incorporated by reference as a part of this application.

BACKGROUND OF THE INVENTION

Field of the Invention

The present invention relates to a work device using a parallel link mechanism used in an apparatus, such as an industrial apparatus, that requires a precise and wide operating range.

Description of Related Art

A link actuation device that has a compact configuration and is capable of operating in a precise and wide operating range has been disclosed in, for example, Patent Document 1. Also, a control method has been disclosed in Patent Document 2, in which a plurality of work points are continuously moved within a work space at which an end effector mounted at a distal end of a link actuation device carries out work. Patent Document 3 discloses a configuration in which the link actuation device of Patent Document 2 and a linear motion mechanism are combined.

Further, Patent Document 4 discloses a control device for an articulated robot. The control device of Patent Document 4 includes: a parameter storage for storing monitored-point information; an orbit generating unit for generating operation of e.g. a support and/or each joint based on a movement command; a controlled-point velocity controller for determining a velocity of a controlled point of the support and/or each joint; a monitored-point velocity controller for determining a velocity of a monitored point generated from the operation velocity of the controlled point; and an operation command unit for selecting a maximum velocity from the velocity of the controlled point and the velocity of the monitored point, comparing the maximum velocity with a commanded velocity, and when the maximum velocity exceeds the commanded velocity, changing the velocity of the controlled point to the commanded velocity.

RELATED DOCUMENT

Patent Document

[Patent Document 1] JP Patent No. 5785055
[Patent Document 2] JP Laid-open Patent Publication No. 2015-155124
[Patent Document 3] JP Laid-open Patent Publication No. 2015-188945
[Patent Document 4] WO02/066210

In a work device using a parallel link mechanism in which a link actuation device is combined with a single- or multi-axis actuator, as shown in Patent Document 3, there are cases where a work point of an end effector is not moved, while only a posture of the end effector is changed. The control method described in Patent Document 2, however, is intended to continuously move work points of a plurality of end effectors at a constant velocity and is not applicable to the cases where a work point of an end effector 6 is not moved, while only the posture of the end effector is changed.

Where work points of a plurality of end effectors are continuously moved at a constant velocity, there may be a section, in the course of such a movement, where tip positions of the end effectors are moved at a minor extent, while only the postures of the end effectors are greatly changed. In such a case, if a velocity of the tip positions is commanded, time for the movement is shortened in that section, possibly causing the entire work device to start abruptly operating at high velocity, as in the case of a singular posture of an articulated robot, which may negatively affect a motor.

SUMMARY OF THE INVENTION

An object of the present invention is to provide a work device using a parallel link mechanism capable of preventing the entire work device from operating abruptly at high velocity, even where a work point of an end effector is not moved, while only a posture of the end effector is changed, or even where a work point of an end effector is moved at a minor extent, while a posture of the end effector is greatly changed, so that even a less-experienced operator can easily operate the work device.

Hereinafter, a work device 1 using a parallel link mechanism 10 according to the present invention will be described with reference numerals used in embodiments.

The present invention provides a work device 1 using a parallel link mechanism 10, the work device 1 including a link actuation device 7. The link actuation device 7 includes the parallel link mechanism 10 having: a proximal-end-side link hub 12; a distal-end-side link hub 13; and three or more link mechanisms 14 each coupling the distal-end-side link hub 13 to the proximal-end-side link hub 12 such that a posture of the distal-end-side link hub 13 can be changed relative to the proximal-end-side link hub 12. Each of the link mechanisms 14 includes: a proximal-side end link member having one end rotatably coupled to the proximal-end-side link hub 12; a distal-side end link member having one end rotatably coupled to the distal-end-side link hub 13; and an intermediate link member having opposite ends rotatably coupled to the other ends of the proximal-side and distal-side end link members. The link actuation device 7 further includes posture control actuators 11 (11-1, 11-2, 11-3) provided to two or more link mechanisms 14 of the three or more link mechanisms 14 and configured to change the posture of the distal-end-side link hub 13 relative to the proximal-end-side link hub 12.

The work device 1 further includes:
an end effector 6 attached to the distal-end-side link hub 13;
a single-axis or multi-axis combined-side actuator 71-72, 85-87, 95-97 combined with the link actuation device 7 and configured to relatively change a work point P of the end effector 6 and a reference position of the link actuation device 7; and
a control device 2 configured to control the posture control actuators 11 and the combined-side actuator 71-72, 85-87, 95-97.

In the work device using the parallel link mechanism 10, the control device 2 includes:
a storage 3 configured to store a plurality of work coordinates (XPi, YPi, ZPi) that are coordinates of individual work points Pi (i=0, 1, 2, . . . ) within a work space at which the end effector 6 carries out work; and a controller 4 configured to calculate movement amounts of the respective actuators 11, 71-72, 85-87, 95-97 and distances between the work coordinates (XPi, YPi, ZPi) from the work coordinates (XPi, YPi, ZPi) stored in the storage 3 and to calculate movement velocities of the respective actuators 11, 71-72, 85-87, 95-97 using a predetermined target velocity of the end effector, so as to operate the respective actuators 11, 71-72, 85-87, 95-97 by the movement amounts and at the movement velocities calculated for the respective actuators 11, 71-72, 85-87, 95-97.

The storage 3 stores, as the target velocity, a predetermined work-point movement velocity to be set for continuously moving the end effector between the work coordinates (XPi, YPi, ZPi) at a constant velocity and a posture change velocity to be set for changing a posture of the end effector 6 at a predetermined angular velocity.

The controller 4 includes a switching function unit 4a configured to switch the target velocity to the work-point movement velocity and to the posture change velocity.

The "work-point movement velocity" and the "posture change velocity" may be set to an arbitrary value depending on designs.

Where the work point P of the end effector 6 is moved at a minor extent, and the posture of the end effector 6 is greatly change, there is a possibility that an attempt of operating the end effector at the work-point movement velocity that is the predetermined target velocity for continuously moving the work point P of the end effector 6 may result in an excessively high velocity for changing the posture of the end effector 6, possibly causing the entire work device to abruptly move at high velocity. According to the work device 1 of this configuration, however, the switching function unit makes it possible to switch from the work-point movement velocity to the posture change velocity. Thus, the target velocity of the end effector 6 can be set to the posture change velocity that is slower than the work-point movement velocity, and therefore, the entire work device can be prevented from operating abruptly at high velocity.

For example, in the configuration of the work device 1 in which the parallel link mechanism 10 is combined with a single-axis or multi-axis combined-side actuator 71-72, 85-87, 95-97, the posture is changed from posture A to posture B, and the position of the combined-side actuator 71-72, 85-87, 95-97 is changed from position C to position D. At the same time, the work point of the end effector 6 mounted at a distal end of the link actuation device 7 is changed from P to Q. It should be noted that an arbitrary point of the work points Pi is denoted with "P," and another point is denoted with "Q." Also, a work point that is not specified in terms of its position may be referred to as "work point P."

In that process, there are cases where the work point P of the end effector 6 is not changed (P=Q), while the posture of the parallel link mechanism 10 is changed (A≠B). In that case, the movement amounts of the actuators 11 of the parallel link mechanism 10 and of the combined-side actuator 71-72, 85-87, 95-97 are controlled such that the posture is changed at the posture change velocity that is the predetermined angular velocity.

Specifically, time (1) required to change the posture is calculated from ∠APB (=∠AQB) and the posture change velocity set by an operator in advance, and movement amounts (2) of the respective actuators 11, 71-72, 85-87, 95-97 are calculated for the case of changing the posture from posture A to posture B (at the same time, moving the position from position C to position D). From the time (1) and the movement amounts (2), the movement velocities of the respective actuators 11, 71-72, 85-87, 95-97 are calculated (movement velocity=movement amount/time=(2)/(1)).

In this way, even where there is a section, in the course of continuously moving the end effector 6 through a plurality of work points P, where a work point P of the end effector 6 is not moved, while only the posture of the end effector 6 is changed, the movement velocities of the respective actuators 11, 71-72, 85-87, 95-97 can be controlled.

In the present invention, the switching function unit 4a may be configured to set the target velocity to the work-point movement velocity when a movement distance of the end effector 6 is above a movement distance threshold and to the posture change velocity when the movement distance is below the movement distance threshold. A determination of being "above or below" may be made on the basis of whether a value is "equal to or greater than; or below" a threshold or "above (or exceeding); or equal to or less than" the threshold. In this respect, a circumstance that the work point P of the end effector 6 is not moved or is moved at a minor extent is determined on the basis of whether the movement distance of the work point P of the end effector 6 falls within the predefined "movement distance threshold."

Where the work point P of the end effector 6 is moved at a minor extent, while the posture of the end effector 6 is greatly changed, operation at the predetermined target velocity ("work-point movement velocity") for continuously moving the work point P of the end effector 6 may result in an excessively high velocity for changing the posture of the end effector 6, possibly causing the entire work device to abruptly move at high velocity. Use of the movement distance threshold to automatically switch from the work-point movement velocity to the posture change velocity, however, allows even a less-experienced operator to prevent the entire work device from abruptly operating at high velocity.

In the present invention, the switching function unit 4a may be configured to set the target velocity to the posture change velocity when at least one of the movement velocities of the respective actuators 11, 71-72, 85-87, 95-97 calculated from the work-point movement velocity satisfies a velocity condition of being above a velocity threshold and to the work-point movement velocity when the velocity condition is not satisfied.

For example, as a method of automatically switching from the work-point movement velocity to the posture change velocity, the velocities may be automatically switched when the movement velocities of the respective actuators 11, 71-72, 85-87, 95-97 calculated from the work-point movement velocity exceed a rated velocity of the respective actuators 11, 71-72, 85-87, 95-97. This makes it possible to prevent the entire work device 1 from abruptly operating at high velocity as well as to prevent failure of the respective actuators 11, 71-72, 85-87, 95-97.

In the present invention, there may be a switch 5 that allows an operator to arbitrarily switch the target velocity to the work-point movement velocity and to the posture change velocity. According to this configuration, since the target velocity can be changed to the posture change velocity even where movement of the work point P of the end effector 6 does not fall within the movement distance threshold, an operator can arbitrarily switch the target velocity to the work-point movement velocity and to the posture change velocity.

In the present invention, the controller 4 may include a determination unit 4a configured to determine whether the work device is operable or not, using the movement velocities of the respective actuators 11, 71-72, 85-87, 95-97 calculated from the target velocity, and the control device 2 may include a display unit 5 configured to display whether the work device is operable or not according to a determination result from the determination unit 4a.

Where work points P of a plurality of end effectors 6 are continuously moved at a constant velocity, if there is a section, in the course of such a movement, where tip positions of the end effectors are moved at a minor extent, while only the postures of the end effectors are greatly changed, time for the movement is shortened in that section because velocities of the tip positions are commanded. Therefore, the entire work device starts abruptly operating at high velocity, as in the case of a singular posture of an articulated robot, possibly causing an overload to the actuators 11 (11-1, 11-2, 11-3), such as motors.

According to the above configuration, the controller 4 includes the determination unit 4a configured to determine whether the work device is operable or not, using the movement velocities of the respective actuators 11, 71-72, 85-87, 95-97 calculated from the target velocity, and the display unit 5 is configured to display whether the work device is operable or not according to a determination result from the determination unit 4a. Therefore, it is possible to display a warning to an operator, if it is not operable. The operator viewing the displayed warning can take a suitable action, such as changing the target velocity to a lower value or adjusting the work point P. In this way, only the posture of the end effector 6 is avoided from being changed without moving the work point P of the end effector 6, and therefore, it is possible to prevent the entire work device 1 from abruptly operating at high velocity.

In addition, it is possible to easily control the respective actuators 11, 71-72, 85-87, 95-97 when the work point P of the end effector 6 is not moved, while only the posture of the end effector 6 is changed, as well as to make the operator aware of the switching of the target velocity through the displayed warning.

It should be noted that the combined-side actuator 71-72, 85-87, 95-97 may be connected to a base of the link actuation device 7 so as to change a position of the link actuation device 7, or be connected to a distal end of the link actuation device 7 so as to be attached with the end effector 6 at a tip end thereof, or be configured to move an origin of the work space. The "predetermined target velocity of the end effector 6" is a target velocity that is set in order to continuously move the end effector 6 through coordinates within the work space at a constant velocity, and may be set to an arbitrary value.

In the present invention, the determination unit 4a may be configured to determine whether the movement velocities of all the actuators calculated from the target velocity are equal to or less than a predetermined velocity and to determine that the work device is operable when the condition is met and that the work device is not operable when the condition is not met. The "predetermined velocity" is a threshold that is arbitrarily set through a test or the like. According to this configuration, determination of whether the work device is operable or not based on the movement velocities of all the actuators 11, 71-72, 85-87, 95-97 makes it possible to reliably determine whether the entire work device 1 is operable or not.

In the present invention, the determination unit 4a may be configured to determine if it is necessary to switch the movement velocity depending on whether a movement distance of the end effector 6 exceeds a movement distance threshold, and the switching function unit 4b may be configured to set the target velocity to the work-point movement velocity when it is determined by the determination unit 4a that it is not necessary to switch the movement velocity and switch the target velocity to the posture change velocity when it is determined necessary to switch the movement velocity.

According to this configuration, since the movement distance threshold is automatically switched from the work-point movement velocity to the posture change velocity, even a less-experienced operator can prevent the entire work device 1 from abruptly operating at high velocity.

In the present invention, the determination unit 4a may be configured to determine whether a condition is met or not in which at least one of the movement velocities of the respective actuators 11, 71-72, 85-87, 95-97 calculated from the work-point movement velocity exceeds a predetermined velocity threshold, and the switching function unit 4b may be configured to switch the target velocity for calculating the movement velocities of the respective actuators 11, 71-72, 85-87, 95-97 to the posture change velocity, when the determination unit determines that the condition is met.

This configuration makes it possible to prevent the entire work device 1 from abruptly operating at high velocity as well as to prevent failure of the respective actuators 11, 71-72, 85-87, 95-97.

In these configurations, determination of whether or not switching is necessary by the determination unit 4a and switching of the target velocity by the switching function unit when it is determined that the switching is necessary may be carried out upon completion of setting a parameter. The parameter may be various values that are set prior to actually operating the work device 1 and may include, for example, a target velocity, a work-point movement velocity, a posture change velocity, a predetermined velocity, a movement distance threshold, and a work coordinate. The parameter is stored in the storage 3. The timings, at which the determination by the determination unit 4a is made and at which the switching of the target velocity by the switching function unit 4b is performed, are limited to the time of completion of the parameter setting, not to during program operation, and thus, notification can be given to an operator before starting program operation. This makes it possible to prevent the device from stopping in cases where determination is made during program operation and the device becomes inoperable.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views:

DESCRIPTION OF THE EMBODIMENTS

Hereinafter, embodiments of the present invention will be described with reference to the drawings.

First Embodiment

Figure 1:
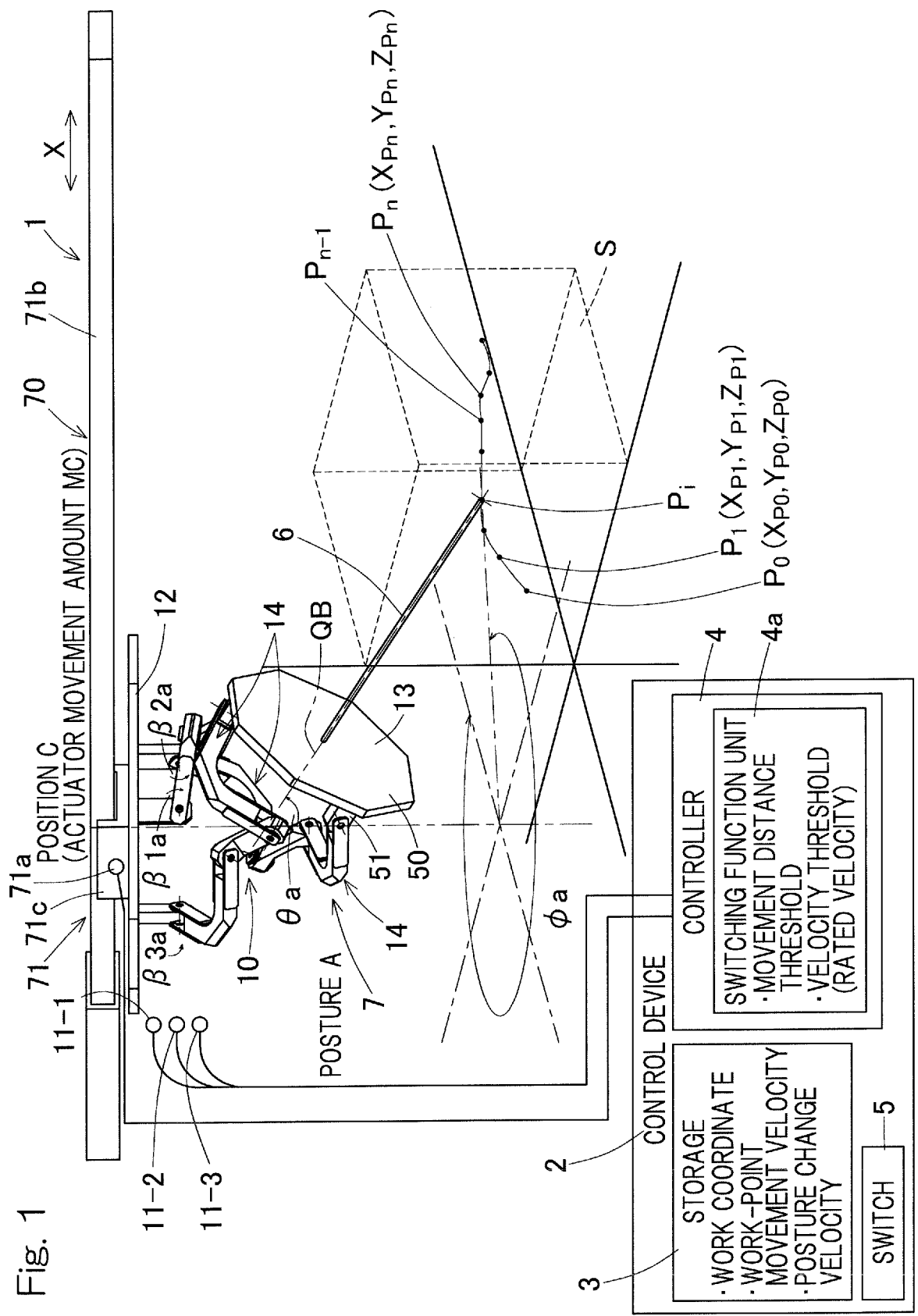
FIG. 1 shows a perspective view of a work device using a parallel link mechanism according to a first embodiment of the present invention, in combination with a block diagram of a control device.

FIG. 1 to FIG. 4 and FIG. 14 to FIG. 18 show a first embodiment of the present invention. The work device 1 using a parallel link mechanism according to the first embodiment includes a link actuation device 7, a single-axis combined-side actuator 71, an end effector 6, and a control device 2. The link actuation device 7 includes a parallel link mechanism 10 and posture control actuators 11 (11-1, 11-2, 11-3) for the parallel link mechanism. The combined-side actuator 71 forms a combined mechanism 70 to be combined with the link actuation device 7. In FIG. 1, the posture control actuators 11 are schematically illustrated.

The combined-side actuator 71 is a single-axis linear actuator that singly forms the combined mechanism 70. The combined-side actuator 71 includes a motor 71a as a driving source, a rail 71b provided therein, and a mobile stage 71c provided so as to be able to advance and retreat along the rail 71b in a left and right directions (X-axis directions). The mobile stage 71c is advanced and retracted by a motor 71a. The rotation of the motor 71a is transmitted between the mobile stage 71c and the rail 71b through a rotation-linear motion converting mechanism (not illustrated), such as a ball screw or a rack-pinion mechanism. The motor 71a may be installed in the mobile stage 71c or be provided to the rail 71b. The mobile stage 71c has a lower surface on which the link actuation device 7 is mounted. Specifically, a proximal-end-side link hub 12 of the link actuation device 7 is fixed to the lower surface of the mobile stage 71c.

Figure 15:
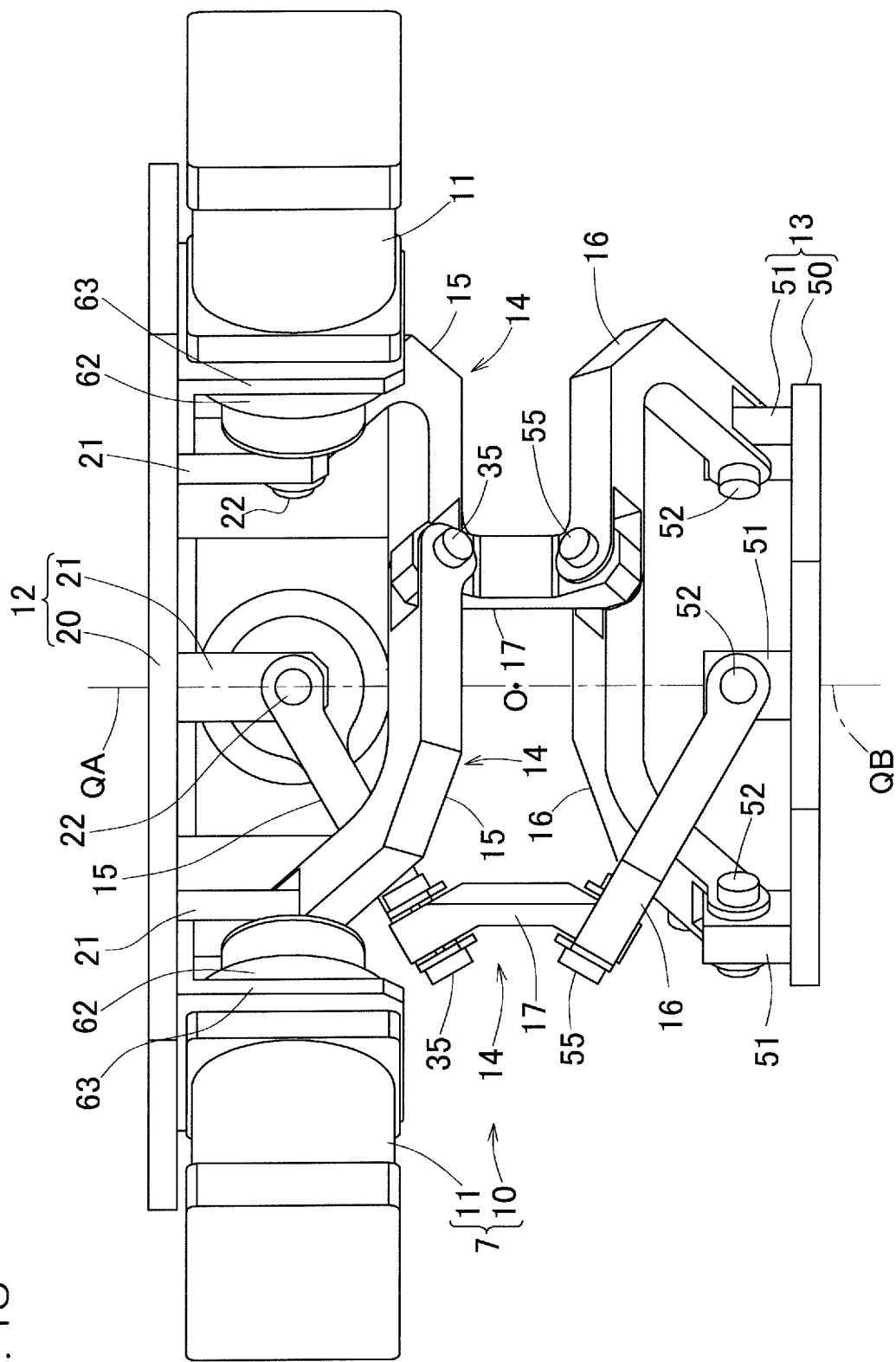
FIG. 15 is a perspective view showing an operation state of the link actuation device.
Figure 16:
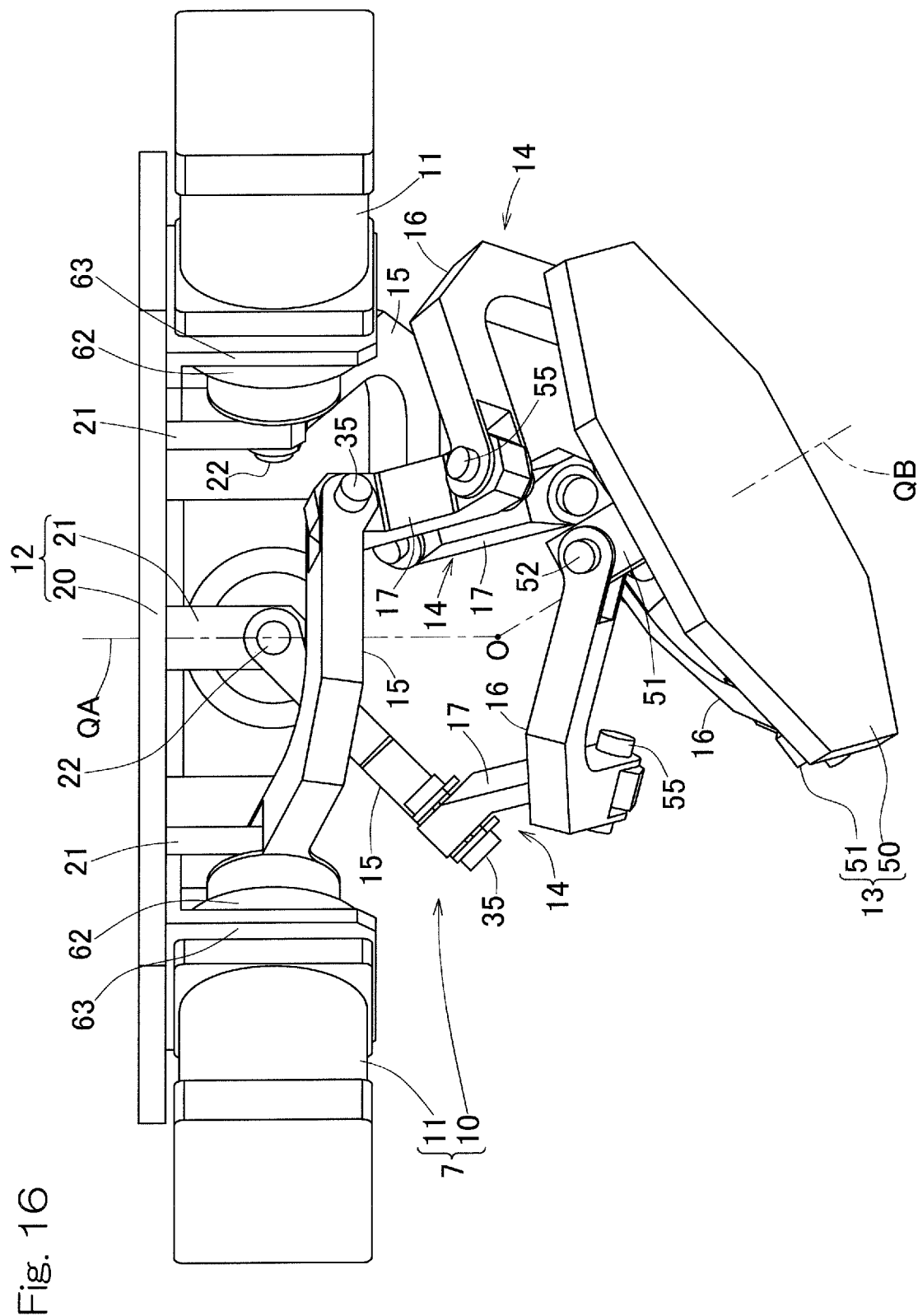
FIG. 16 is a perspective view showing another operation state of the link actuation device.

The link actuation device 7 will be described in detail. As shown in FIG. 15 and FIG. 16, the parallel link mechanism 10 of the link actuation device 7 includes: a proximal-end-side link hub 12; a distal-end-side link hub 13; and three link mechanisms 14 each coupling the distal-end-side link hub 13 to the proximal-end-side link hub 12 such that a posture of the distal-end-side link hub 13 can be changed relative to the proximal-end-side link hub 12. There may be four or more the link mechanisms 14.

Figure 14:
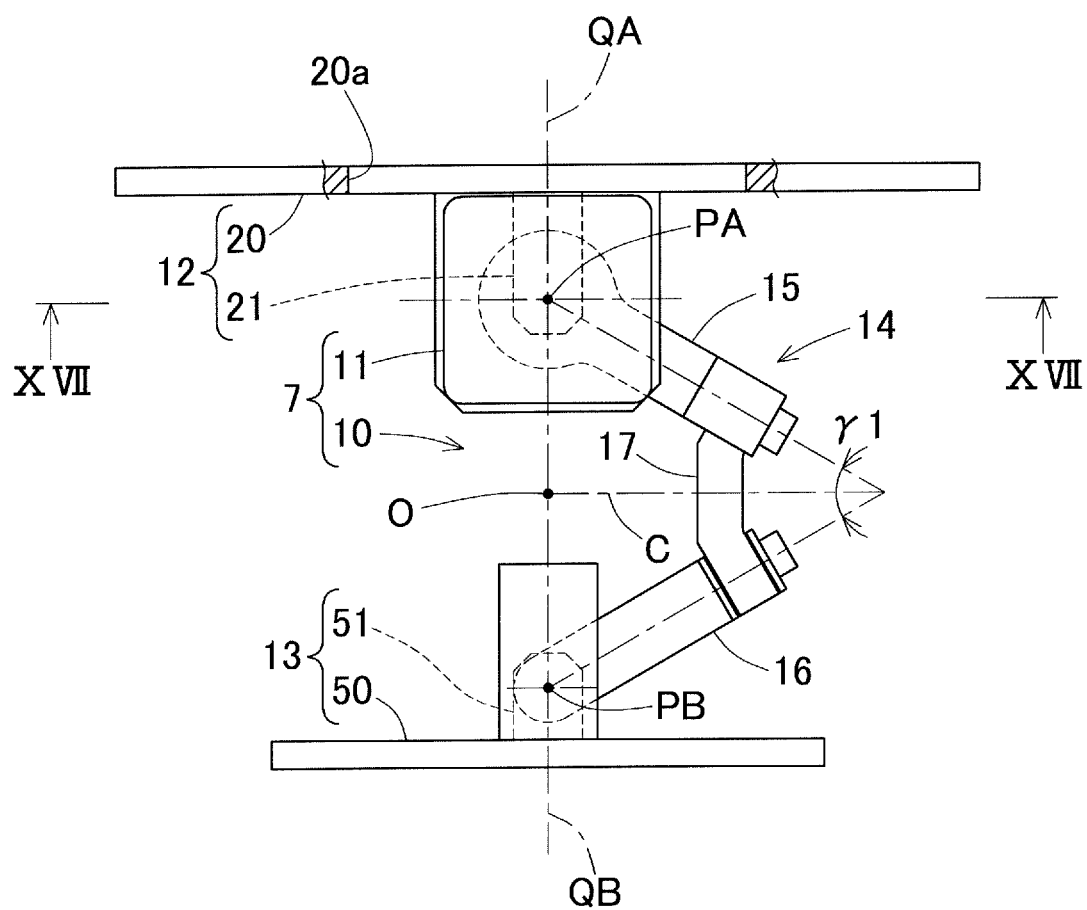
FIG. 14 is a front view showing a part of a link actuation device in the work device according to the first embodiment.

FIG. 14 shows one of the link mechanisms 14. As shown in FIG. 14, each of the link mechanisms 14 includes: a proximal-side end link member 15; a distal-side end link member 16; and an intermediate link member 17, and forms a quadric-chain link mechanism having four revolute pairs. Each of the proximal-side and distal-side end link members 15, 16 has an L shape. The proximal-side end link member 15 has one end rotatably coupled to the proximal-end-side link hub 12, and the distal-side end link member 16 has one end rotatably coupled to the distal-end-side link hub 13. The other ends of the proximal-side and distal-side end link members 15, 16 are rotatably coupled with opposite ends of the intermediate link member 17 through rotation shafts 35, 55 (FIG. 15).

The parallel link mechanism 10 has a structure in which two spherical link mechanisms are combined. The center axis of each revolute pair of the proximal-end-side link hub 12 and the proximal-side end link member 15 intersects with the center axis of each revolute pair of the proximal-side end link member 15 and the intermediate link member 17 at the center PA of a proximal-end-side spherical link. Similarly, the center axis of each revolute pair of the distal-end-side link hub 13 and the distal-side end link member 16 intersects with the center axis of each revolute pair of the distal-side end link member 16 and the intermediate link member 17 at the center PB of a distal-end-side spherical link.

There is the same distance from each revolute pair of the proximal-end-side link hub 12 and the proximal-side end link member 15 to the center PA of the proximal-end-side spherical link, and there is also the same distance from each revolute pair of the proximal-side end link member 15 and the intermediate link member 17 to the center PA of the proximal-end-side spherical link. Similarly, there is the same distance from each revolute pair of the distal-end-side link hub 13 and the distal-side end link member 16 to the center PB of the distal-end-side spherical link, and there is also the same distance from each revolute pair of the distal-side end link member 16 and the intermediate link member 17 to the center PB of the distal-end-side spherical link. The center axis of the revolute pair of the proximal-side end link member 15 and the intermediate link member 17 may be tilted at a certain intersection angle γl with respect to or be in parallel with the center axis of the revolute pair of the distal-side end link member 16 and the intermediate link member 17.

Figure 17:
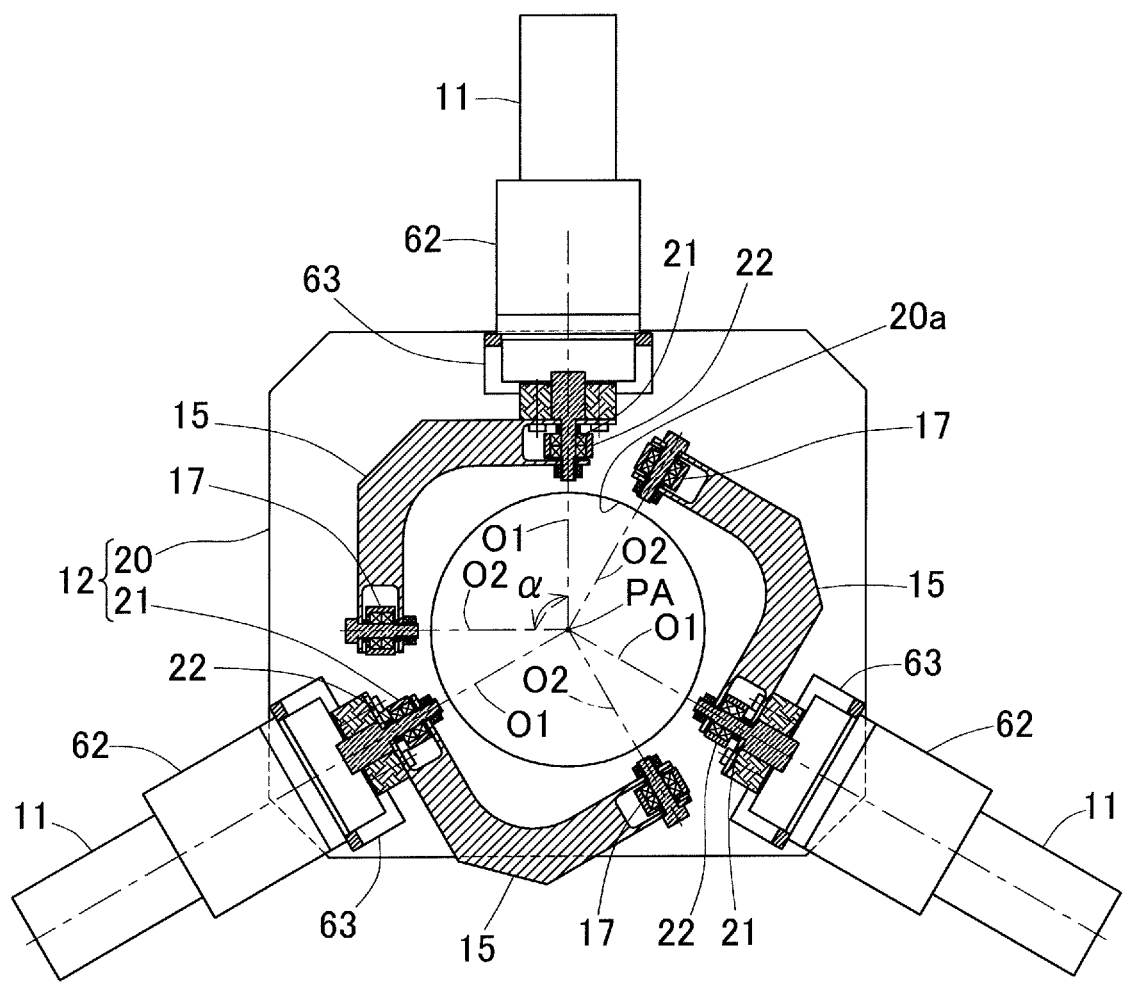
FIG. 17 is a sectional view along line XVII-XVII in FIG. 14.

FIG. 17 is a sectional view along line XVII-XVII in FIG. 14. FIG. 17 shows a relationship among the center axis O1 of each revolute pair of the proximal-end-side link hub 12 and the proximal-side end link member 15, the center axis O2 of each revolute pair of the intermediate link member 17 and the proximal-side end link member 15, and the center PA of the proximal-end-side spherical link. The point at which the center axis O1 and the center axis O2 intersect corresponds to the center PA of the spherical link. The shapes of and positional relationship between the distal-end-side link hub 13 and the distal-side end link member 16 are the same as those shown in FIG. 17 (not illustrated).

In FIG. 17, the center axis O1 of each revolute pair of the proximal-end-side link hub 12 (distal-end-side link hub 13) and the proximal-side end link member 15 (distal-side end link member 16) forms an angle α of 90° with the center axis O2 of each revolute pair of the proximal-side end link member 15 (distal-side end link member 16) and the intermediate link member 17. The angle α may not necessarily be 90°.

Figure 18:
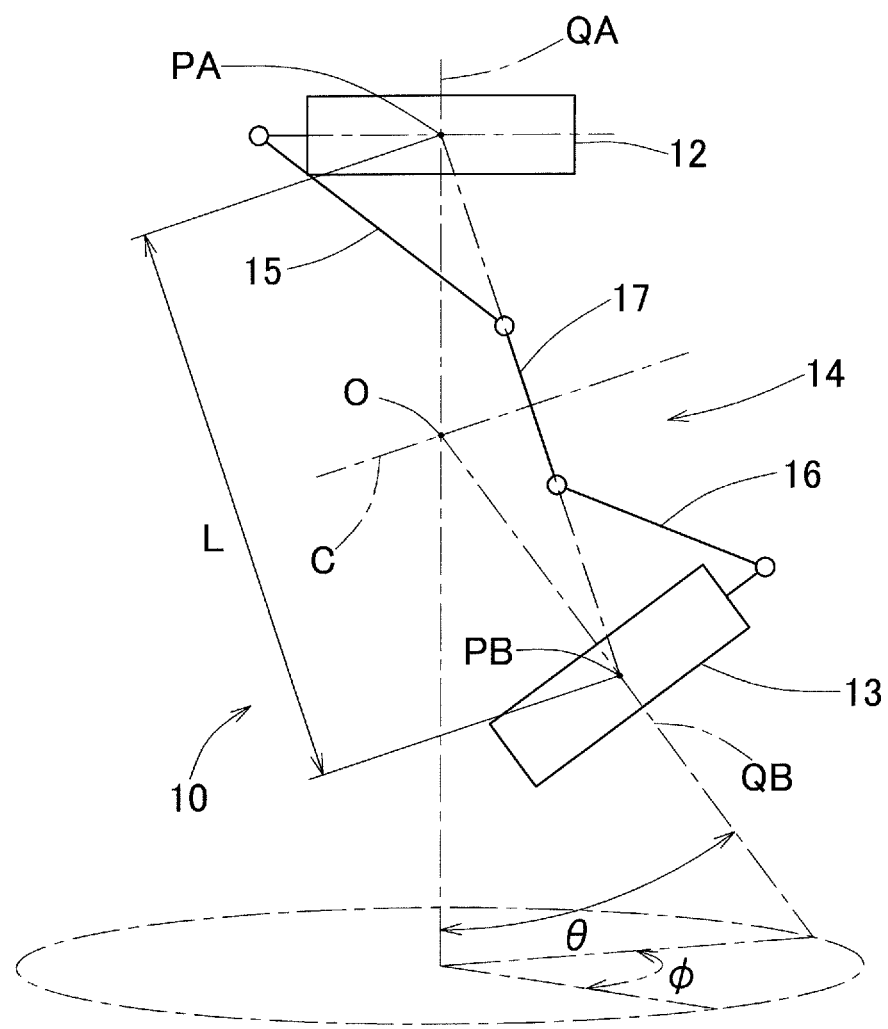
FIG. 18 is a model diagram showing the link actuation device with straight lines.

The three link mechanisms 14 have geometrically the same shape. The expression "geometrically the same shape" means that, as shown in FIG. 18, a geometric model that represents the respective link members 15, 16, 17 with straight lines, that is, a model that is represented by the respective revolute pairs and lines connecting these revolute pairs, has such a shape that a proximal-end-side part and a distal-end-side part with respect to a central part C of the intermediate link member 17 are symmetrical to each other. FIG. 18 illustrates one link mechanism 14 with straight lines.

The parallel link mechanism 10 of this embodiment is of a rotationally symmetric type. That is, the positional relationship between the proximal-end-side part formed by the proximal-end-side link hub 12 and the proximal-side end link member 15 and the distal-end-side part formed by the distal-end-side link hub 13 and the distal-side end link member 16 is rotationally symmetric with respect to a center line C of the intermediate link member 17. The central parts C of the respective intermediate link members 17 are located on a common orbital circle.

The proximal-end-side link hub 12, the distal-end-side link hub 13, and the three link mechanisms 14 cooperate together to form a mechanism having two degrees of freedom that allows distal-end-side link hub 13 to rotatably move about two orthogonal axes relative to the proximal-end-side link hub 12. In other words, this mechanism is operable to change the posture of the distal-end-side link hub 13 relative to the proximal-end-side link hub 12 in two degrees of freedom of rotation. This mechanism having two degrees of freedom makes it possible to achieve a configuration that is compact and provides a wide operating range for the distal-end-side link hub 13 relative to the proximal-end-side link hub 12.

For example, the line that passes through the center PA of the proximal-end-side spherical link and orthogonally intersects with the center axis O1 (FIG. 18) of each revolute pair of the proximal-end-side link hub 12 and the proximal-side end link member 15 is referred to as a center axis QA of the proximal-end-side link hub 12. Similarly, the line that passes through the center PB of the distal-end-side spherical link and orthogonally intersects with to the center axis O1 (FIG. 18) of each revolute pair of the distal-end-side link hub 13 and the distal-side end link member 16 is referred to as a center axis QB of the distal-end-side link hub 13. In that case, a bend angle θ between the center axis QA of the proximal-end-side link hub 12 and the center axis QB of the distal-end-side link hub 13 may have a maximum angle of about ±90°. A turning angle φ of the distal-end-side link hub 13 with respect to the proximal-end-side link hub 12 may be set in a range of 0° to 360°.

The bend angle θ is a vertical angle at which the center axis QB of the distal-end-side link hub 13 is tilted with respect to the center axis QA of the proximal-end-side link hub 12. The turning angle φ is a horizontal angle at which the center axis QB of the distal-end-side link hub 13 is tilted with respect to the center axis QA of the proximal-end-side link hub 12.

The posture of the distal-end-side link hub 13 relative to the proximal-end-side link hub 12 is changed in such a manner that a rotation center is located at an intersection O of the center axis QA of the proximal-end-side link hub 12 and the center axis QB of the distal-end-side link hub 13. In a state at an origin where the center axis QA of the proximal-end-side link hub 12 and the center axis QB of the distal-end-side link hub 13 are on the same line (FIG. 15), the distal-end-side link hub 13 faces directly downward. FIG. 1 and FIG. 16 show a state where the center axis QB of the distal-end-side link hub 13 has a certain operation angle with respect to the center axis QA of the proximal-end-side link hub 12. Even where the posture is changed, the distance L between the centers PA, PB of the proximal-end-side and the distal-end-side spherical links (FIG. 18) does not change.

Where each of the link mechanisms 14 satisfies the following conditions 1 to 5, the proximal-end-side part formed by the proximal-end-side link hub 12 and the proximal-side end link member 15 moves in the same manner as the distal-end-side part formed by the distal-end-side link hub 13 and the distal-side end link member 16 because of the geometric symmetry. Therefore, the parallel link mechanism 10 functions as a constant velocity universal joint that has the same rotation angle on the proximal end side and the distal end side and rotates at a constant velocity, when rotation is transmitted from the proximal end side to the distal end side.

Condition 1: the center axes O1 of the revolute pairs of the proximal-end-side link hub 12 {distal-end-side link hub 13) and the proximal-side end link members 15 (distal-side end link members 16) of the respective link mechanisms 14 have mutually the same angle and length.

Condition 2: the center axis O1 of the revolute pair of the proximal-end-side link hub 12 (distal-end-side link hub 13) and the proximal-side end link member 15 (distal-side end link member 16) intersects with the center axis O2 of the revolute pair of the proximal-side end link member 15 (distal-side end link member 16) and the intermediate link member 17, at the center PA of the proximal-end-side spherical link (center PB of the distal-end-side spherical link).

Condition 3: the proximal-side end link member 15 and the distal-side end link member 16 have the same geometric shape.

Condition 4: the proximal-end-side part and the distal-end-side part of the intermediate link member 17 have the same geometric shape.

Condition 5: the angular position relationship between the intermediate link member 17 and the proximal-side end link member 15 with respect to a symmetry plane C of the intermediate link member 17 is the same as the angular position relationship between the intermediate link member 17 and the distal-side end link member 16.

As shown in FIG. 15, the proximal-end-side link hub 12 includes a proximal end member 20 and three rotation shaft coupling members 21 integrally provided with the proximal end member 20. The proximal end member 20 has a round through hole 20a (see FIG. 17) in a central part thereof, and the three rotation shaft coupling members 21 are disposed around the through hole 20a at equal intervals in a circumferential direction. The center of the through hole 20a is located on the center axis QA (FIG. 14) of the proximal-end-side link hub 12. Each rotation shaft coupling member 21 is rotatably coupled with a rotation shaft 22. The axis of the rotation shaft 22 intersects with the center axis QA of the proximal-end-side link hub 12. The rotation shaft 22 is coupled with one end of the proximal-side end link member 15.

As shown in FIG. 15, the distal-end-side link hub 13 includes a plate-like distal end member 50 and three rotation shaft coupling members 51 provided to an inner surface of the distal end member 50 at equal intervals in a circumferential direction. The center of the circumference, on which the three rotation shaft coupling members 51 are disposed, is located on the center axis QB of the distal-end-side link hub 13. Each rotation shaft coupling member 51 is rotatably coupled with a rotation shaft 52. The axis of the rotation shaft 52 intersects with the center axis QB of the distal-end-side link hub 13. The rotation shaft 52 of the distal-end-side link hub 13 is coupled with one end of the distal-side end link member 16.

The other end of the distal-side end link member 16 is coupled with a rotation shaft 55. The rotation shaft 55 is rotatably coupled with the other end of the intermediate link member 17. The rotation shaft 52 of the distal-end-side link hub 13 and the rotation shaft 55 of the intermediate link member 17 are rotatably coupled to the other ends of the rotation shaft coupling member 51 and the intermediate link member 17, respectively, through two bearings (not illustrated).

The posture control actuators 11 of the link actuation device 7 are rotary actuators each having a speed reduction mechanism 62. The posture control actuators 11 is disposed on a lower surface of the proximal end member 20 of the proximal-end-side link hub 12 so as to be coaxial with the rotation shaft 22. The posture control actuators 11 and the speed reduction mechanisms 62 are integrally provided, and the speed reduction mechanisms 62 are fixed to the proximal end member 20 by motor fixing members 63. In this example, all of the three link mechanisms 14 are provided with the posture control actuators 11. It should be noted that as long as at least two of the three link mechanisms 14 are provided with the posture control actuators 11, the posture of the distal-end-side link hub 13 relative to the proximal-end-side link hub 12 can be determined.

In the link actuation device 7, the respective posture control actuators 11 are rotationally driven so that the parallel link mechanism 10 are operated. Specifically, when the posture control actuators 11 are rotationally driven, the rotation of the actuator 11 is transmitted to the rotation shaft 22 with its speed reduced through the speed reduction mechanism 62. Thus, the angle of the proximal-side end link member 15 relative to the proximal-end-side link hub 12 is changed, and the posture of the distal-end-side link hub 13 is changed relative to the proximal-end-side link hub 12.

In FIG. 1, the end effector 6 is operable to early out work on an object (not illustrated) by the work device 1. The end effector 6 may be, for example, an application nozzle, an air nozzle, a welding torch, a camera, a clamping mechanism. In the example shown in FIG. 1, the end effector 6 is a device (for example, an application nozzle) that is mounted to the distal-end-side link hub 13 so as to protrude along the center axis QB and has a distal end as a work point P. The work point P of the end effector 6 may be separated from the distal end of the end effector 6 in an extension direction of the center axis QB.

The control device 2 is operable to control the posture control actuators 11 (11-1 to 11-3) and the combined-side actuator 71. The control device 2 may include a computer, a program executed on the computer, and an electronic circuit. The control device 2 includes a storage 3, a controller 4 and a switch 5. The controller 4 includes a switching function unit 4a. The storage 3 stores a plurality of work coordinates (XPi, YPi, ZPi) that are coordinates of individual work points Pi (i=0, 1, 2, 3, . . . ) within a work space S at which the end effector 6 carries out work. The storage 3 stores the work-point movement velocity and the posture change velocity, in addition to the coordinates. The work-point movement velocity is a predetermined target velocity that is set in order to continuously move the end effector at a constant velocity through the coordinates (XPi, YPi, ZPi) within the work space S at which the end effector 6 carries out work and may be set to an arbitrary value. The posture change velocity is a predetermined target angular velocity that is set in order to change the posture of the end effector 6 at a predetermined velocity and may be set to an arbitrary value.

The controller 4 calculates a movement amount and a distance between the work coordinates for each of the posture control actuators 11 and the combined-side actuator 71 from the work coordinates stored in the storage 3 and calculates movement velocities of the respective actuators 11, 71 from the predetermined target velocity. Further, the controller 4 operates the respective actuators 11, 71 with the movement amounts and at the movement velocities calculated for the respective actuators 11, 71.

The switching function unit 4a automatically switches the predetermined target velocity used for calculating the movement velocities of the respective posture control actuators 11 and the movement velocity of the combined-side actuator 71, to the work-point movement velocity and to the posture change velocity in accordance with a predetermined condition.

For example, the switching function unit 4a may be configured to set the target velocity to the work-point movement velocity when the movement distance of the end effector 6 is above or exceeds a movement distance threshold, and set the target velocity to the posture change velocity when it is below the movement distance threshold. The "movement distance threshold" is a value that is set as a reference distance for determination.

The switching function unit 4a may also be configured to set the target velocity to the posture change velocity when a velocity condition is satisfied and to set the target velocity to the work-point movement velocity when the velocity condition is not satisfied. The "velocity condition" is a condition where at least one of the movement velocities of the respective actuators 11, 71 calculated from the work-point movement velocity is above or exceeds a velocity threshold. The "velocity threshold" is a value that is set as a reference velocity for determination.

The switch 5 is an input operation unit that allows an operator to arbitrarily switch the target velocity to the work-point movement velocity and to the posture change velocity. That is, the operator can operate the switch 5 to arbitrarily switch the target velocity to the work-point movement velocity or to the posture change velocity.

Figure 2:
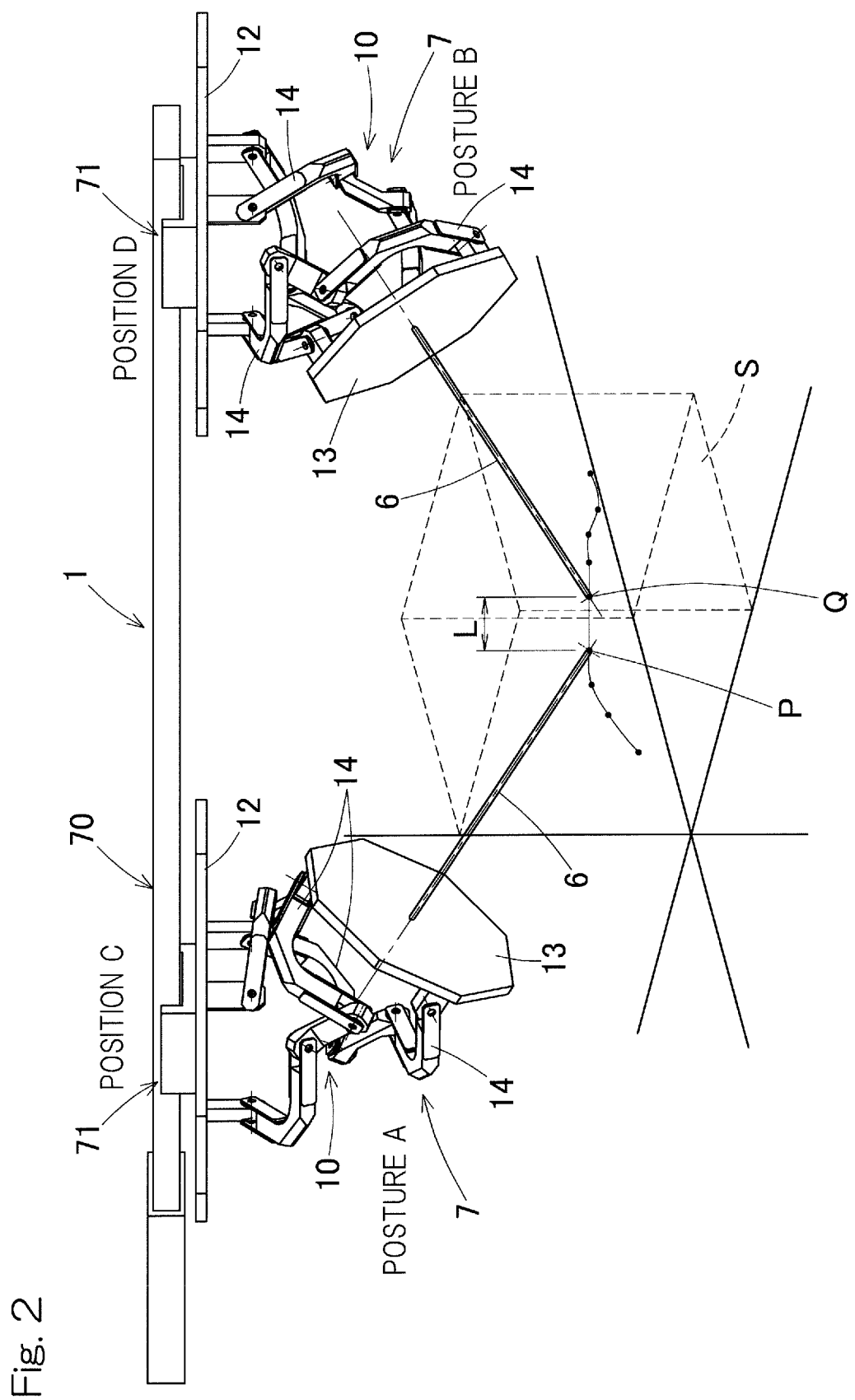
FIG. 2 illustrates an operation of the work device.

Hereinafter, the above configuration will be supplementarily described in terms of exemplary operation and features thereof. FIG. 1 shows an example configuration in which the link actuation device 7 is combined with the combined-side actuator 71 (another single-axis linear actuator). In this configuration, the positions of the three posture change actuators 11 (11-1, 11-2, 11-3) are defined as (β1a, β2a, β3a) when the link actuation device 7 is in posture A (θa, φa). The combined-side actuator 71 has a movement amount Mc at position C (FIG. 2). The work point P of the end effector 6 mounted to the distal end of the link actuation device 7 has a coordinate (Xp, Yp, Zp) within the work space S. In order to simplify the description, an arbitrary point of the work points Pi is denoted with "P," and another point is denoted with "Q" in the figures. Also, an unspecified work point Pi may be simply referred to as "work point P."

FIG. 2 shows a situation where the work point P of the end effector 6 moves from the coordinate (Xp, Yp, Zp) to the coordinate (Xq, Yq, Zq), while the posture of the link actuation device 7 is changed from posture A (θa, φa) to posture B (θb, φb), and the position of the combined-side actuator 71 is changed from position C (Mc) to position D (Md). The time T1 required for this movement can be expressed by the following equation (1), in which a coordinate movement distance (work-point movement distance) for this movement is represented by L, and a predetermined work-point movement velocity is represented by V1.

[Math 1]

$$L = |P - Q| = \sqrt{(Xp - Xq)^2 + (Yp - Yq)^2 + (Zp - Zq)^2}, \quad (1)$$
$$T1 = \frac{L}{V1}$$

Accordingly, where the respective actuators 11-1, 11-2, 11-3, 71 have the movement amounts Δβ1, Δβ2, Δβ3, ΔM, the movement velocities of the respective actuators 11-1, 11-2, 11-3, 71 can be expressed by the following equation (2).

[Math 2]

$$V_{\beta 1} = \frac{\Delta \beta 1}{T1}, V_{\beta 2} = \frac{\Delta \beta 2}{T1}, V_{\beta 3} = \frac{\Delta \beta 3}{T1}, V_M = \frac{\Delta M}{T1} \quad (2)$$

Figure 3:
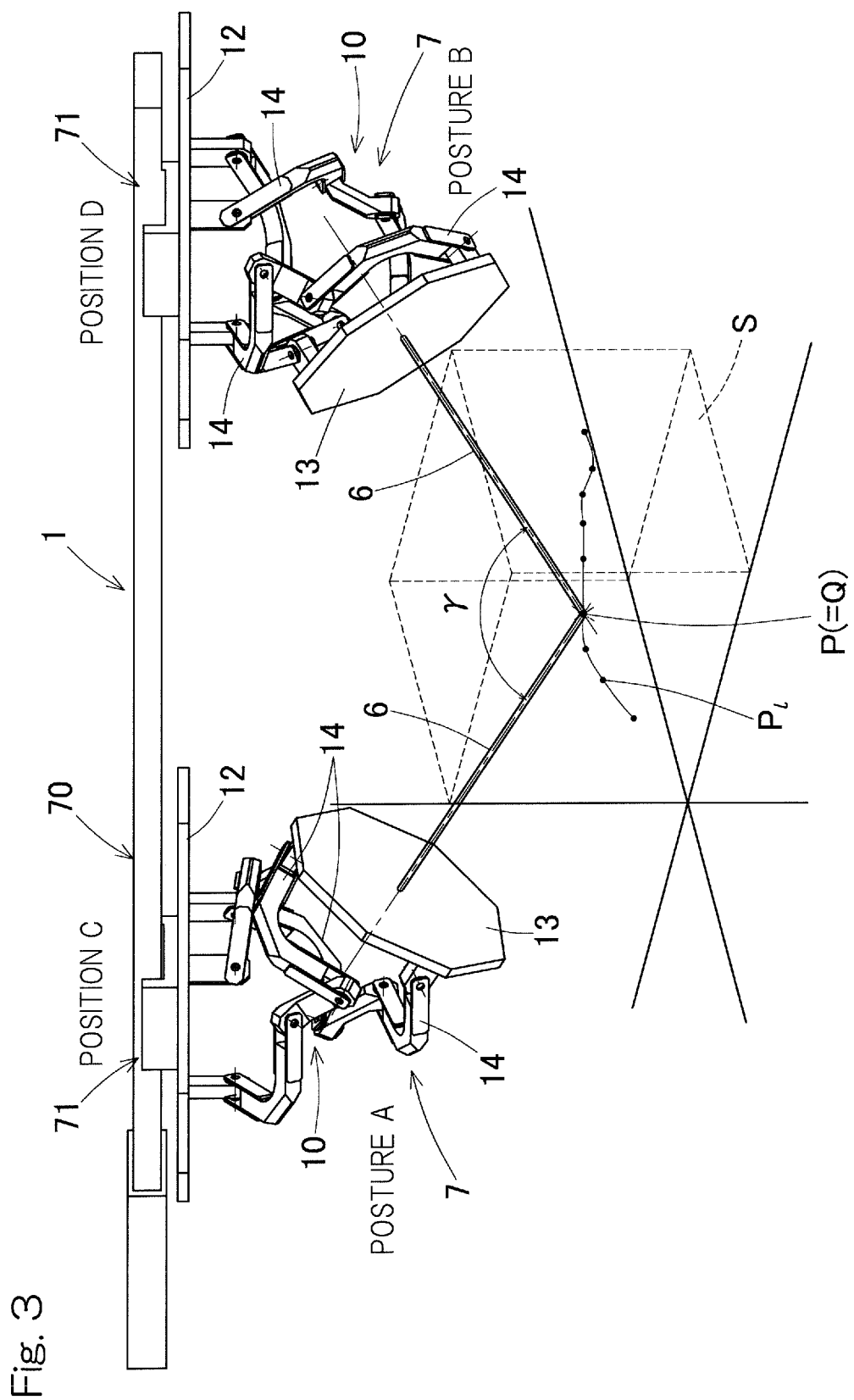
FIG. 3 illustrates another operation of the work device.

FIG. 3 shows a situation where the work point of the end effector 6 remains at point P (P coincides with Q), while the posture of the link actuation device 7 is changed from posture A (θa, φa) to posture B (θb, φb), and the position of the combined-side actuator 71 is changed from position C (Mc) to position D (Md). The time T2 required for this movement can be expressed by the following equation (3), in which the angle formed by posture A and posture B is represented by γ, and a predetermined posture change velocity is represented by V2.

[Math 3]

$$T2 = \gamma / V2 \quad (3)$$

Accordingly, where the respective actuators 11-1, 11-2, 11-3, 71 have the movement amounts Δβ1, Δβ2, Δβ3, ΔM, the movement velocities of the respective actuators 11-1, 11-2, 11-3, 71 can be expressed by the following equation (4).

[Math 4]

$$V_{\beta 1} = \frac{\Delta \beta 1}{T2}, V_{\beta 2} = \frac{\Delta \beta 2}{T2}, V_{\beta 3} = \frac{\Delta \beta 3}{T2}, V_M = \frac{\Delta M}{T2} \quad (4)$$

By switching the use of equation (1); equations (2) and (3); and equation (4), it is possible to switch, in a continuous operation, the operation of moving the work point P of the end effector 6 at the predetermined work-point movement velocity and the operation of changing the posture of the end effector 6 at the predetermined posture change velocity.

FIG. 4 to FIG. 7 show examples of flows in which the controller 4 shown in FIG. 1 switches the movement velocities of the respective actuators 11-1, 11-2, 11-3, 71, using the switching function unit 4a.

Figure 4:
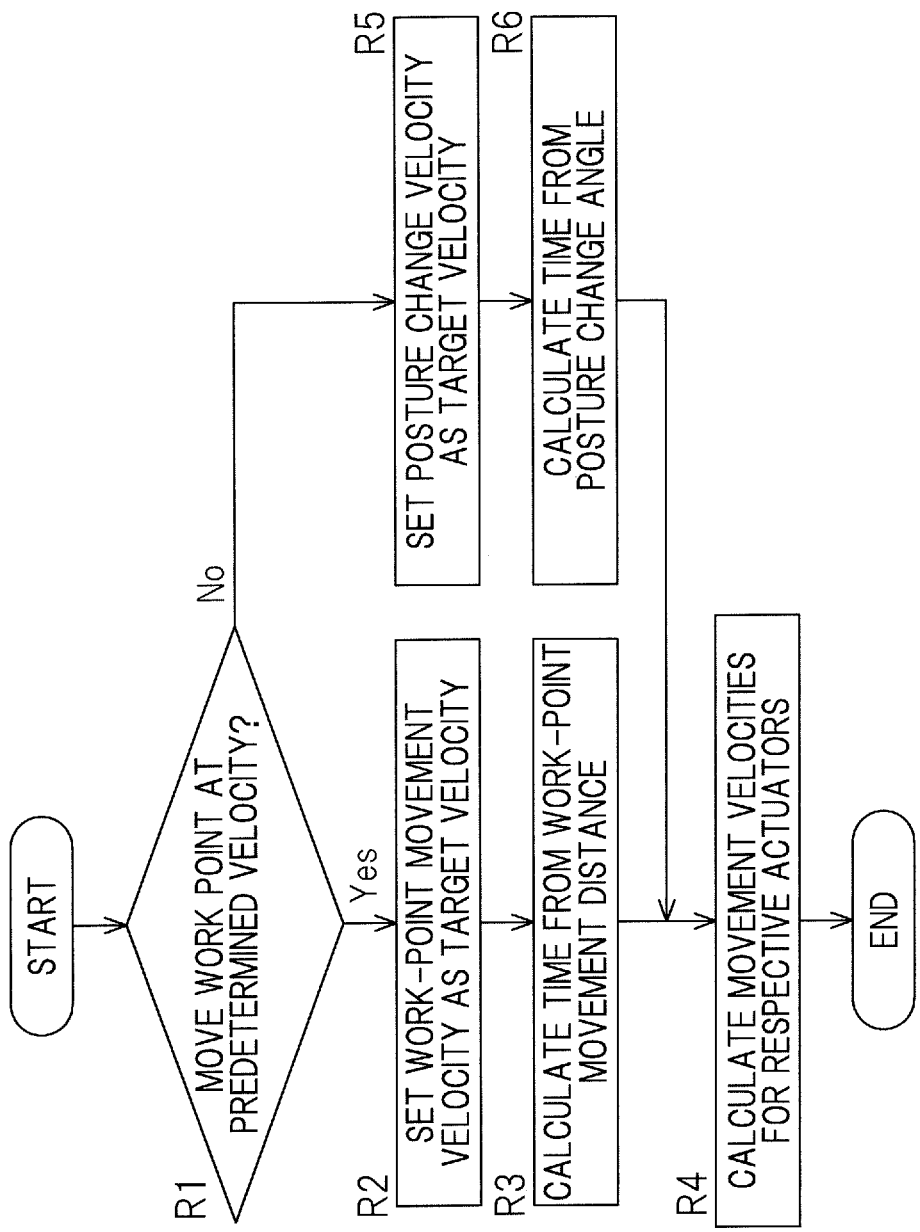
FIG. 4 is a flowchart showing an example of a control performed by the control device of the work device.

In FIG. 4, it is first determined whether the work point is to be moved at a velocity exceeding the predetermined velocity as a reference for the determination, i.e., the velocity threshold (step R1). When the condition is satisfied, the work-point movement velocity is set as the target velocity (step R2). In this case, the controller 4 calculates the time required for moving the work point at the work-point movement velocity from the work-point movement distance (step R3) and calculates the movement velocities of the respective actuators 11-1, 11-2, 11-3, 71 (step R4).

In the determination in step R1, where the work point P is not to be moved at a velocity exceeding the velocity threshold, the posture change velocity is set as the target velocity (step R5). In this case, the time required for changing the posture at the posture change velocity is calculated from a posture change angle (step R6), and the movement velocities of the respective actuators 11-1, 11-2, 11-3, 71 are calculated (step R4).

Figure 5:
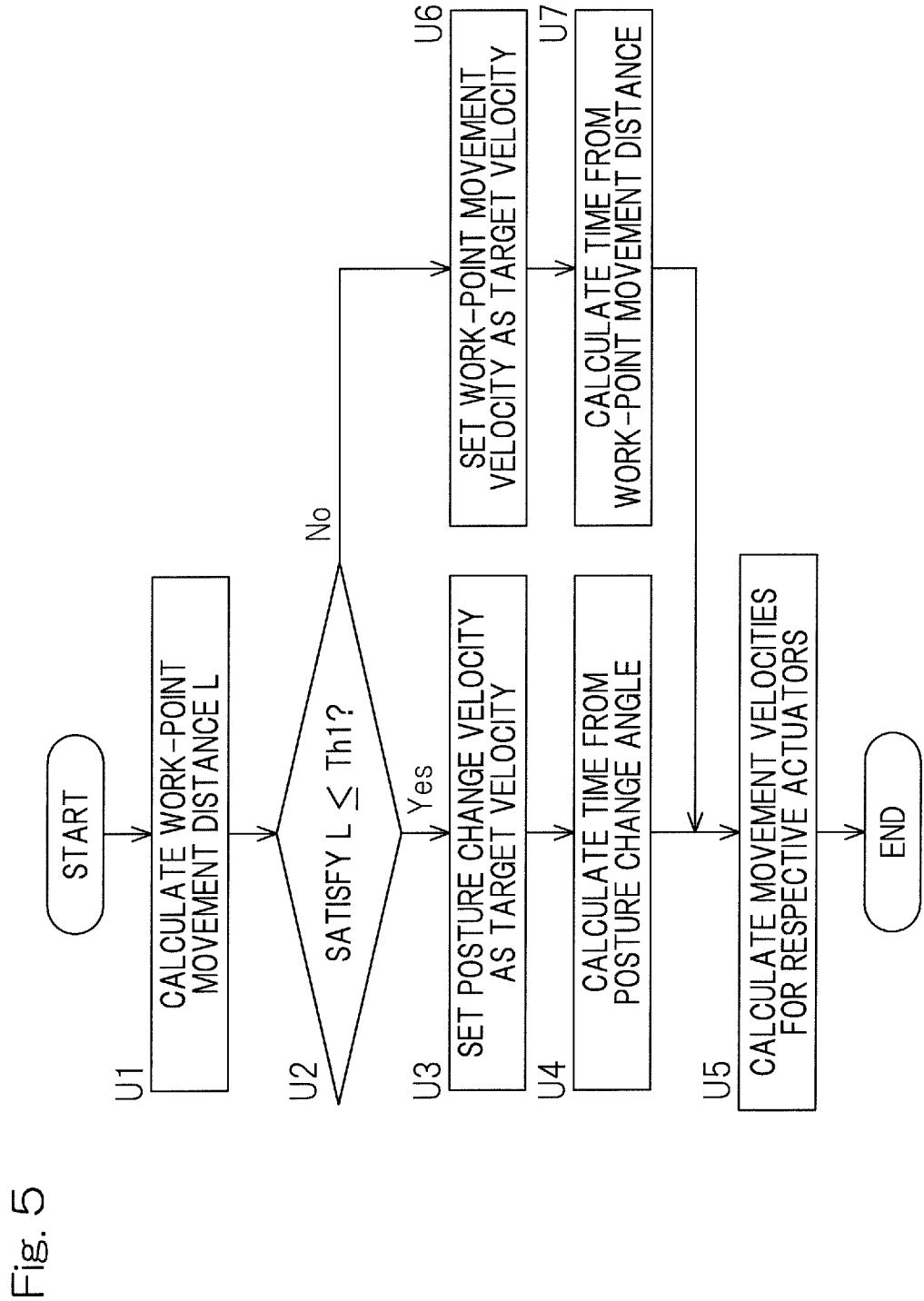
FIG. 5 is a flowchart showing an example of a control performed by a control device of a work device according to a second embodiment.

Second Embodiment, FIG. 5

In this embodiment, even if the work point P does not exactly coincide with the work point Q, when the coordinate movement distance L between the work point P and the work point Q in equation (1) falls within a predetermined movement distance threshold Th1, that is, when equation (5) is satisfied, the work point of the end effector 6 is considered as not being moved from P, and the posture change velocity is used for calculating the velocities of the respective actuators 11-1, 11-2, 11-3, 71.

$$L \leq Th1 \quad (5)$$

Where the work point P of the end effector 6 is moved at a minor extent, while the posture of the end effector 6 is greatly changed, operation at the predetermined work-point movement velocity for continuously moving the work point P of the end effector 6 may result in an excessively high velocity for changing the posture of the end effector 6, possibly causing the entire work device 1 to abruptly move at high velocity. Use of the movement distance threshold, however, makes it possible to automatically switch from the work-point movement velocity to the posture change velocity and to prevent the entire work device 1 from abruptly operating at high velocity.

FIG. 5 shows a flow of switching the movement velocities of the respective actuators 11-1, 11-2, 11-3, 71, using the movement distance threshold Th1. The work-point movement distance L is calculated (step U1), and it is determined whether the work-point movement distance L is equal to or less than the movement distance threshold Th1 (step U2). When the condition is satisfied, the posture change velocity is set as the target velocity (step 3). Then, the time required for operating at the posture change velocity is calculated from the posture change angle (step U4), and the movement velocities of the respective actuators 11-1, 11-2, 11-3, 71 are calculated (step U5).

When it is determined that the condition is not satisfied in step U2, the work-point movement velocity is set as the target velocity (step U6). Then, the time required for operating at the work-point movement velocity is calculated from the work-point movement distance (step U7), and the movement velocities of the respective actuators 11-1, 11-2, 11-3, 71 are calculated (step U5).

Figure 6:
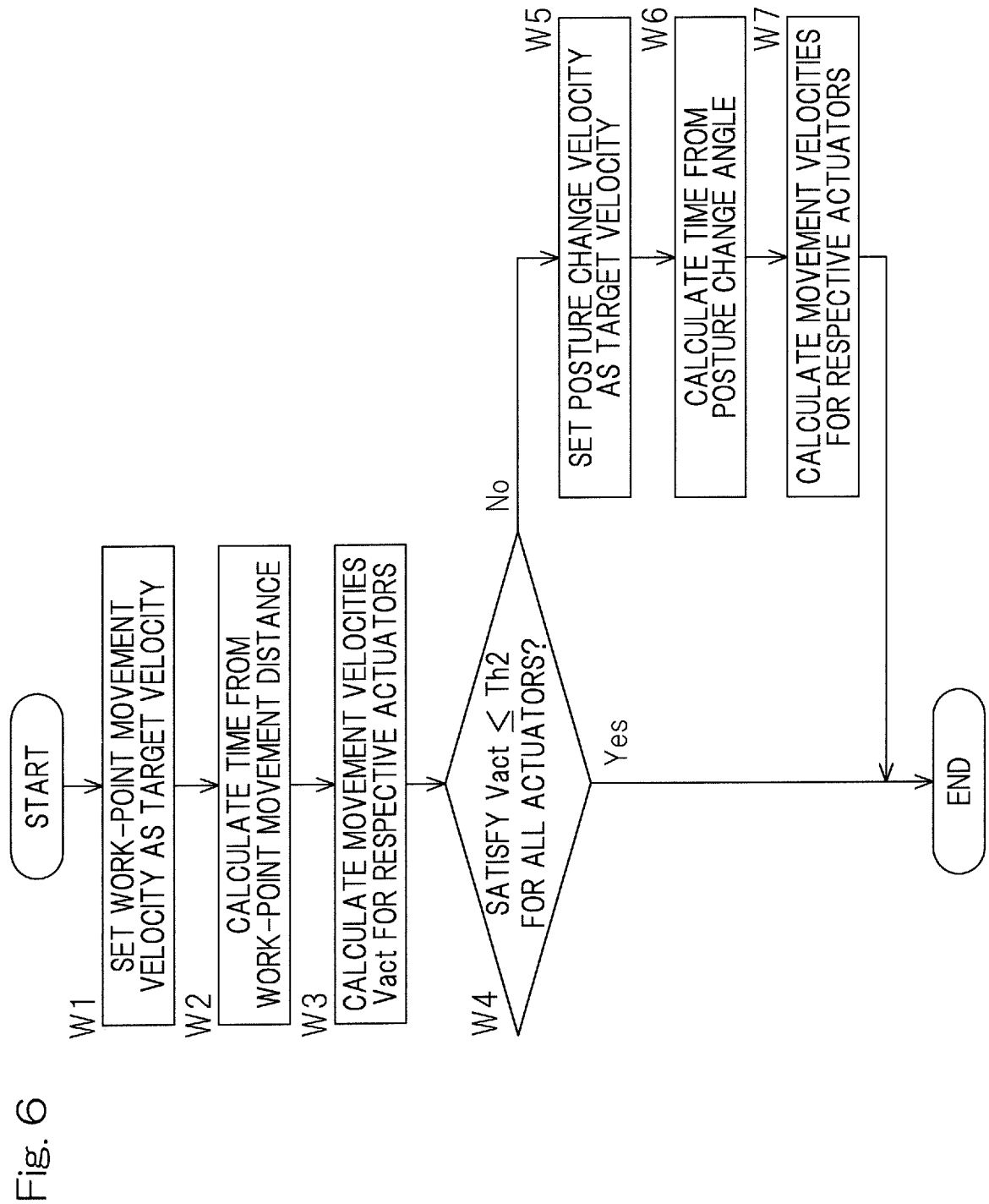
FIG. 6 is a flowchart showing an example of a control performed by a control device of a work device according to a third embodiment.

Third Embodiment, FIG. 6

The movement velocities of the respective actuators 11-1, 11-2, 11-3, 71 are calculated from the coordinate movement distance L between the work point P and the work point Q, the predetermined work-point movement velocity V1, and the movement amounts of the respective actuators 11-1, 11-2, 11-3, 71. Where any one of the calculated movement velocities of the respective actuators 11-1, 11-2, 11-3, 71 exceeds the predetermined velocity threshold Th2, the velocities of the respective actuators 11-1, 11-2, 11-3, 71 are calculated from the posture change velocity.

Thus, even where the coordinate movement distance L between the work point P and the work point Q does not fall within the predetermined movement distance threshold Th1, it is possible to prevent the movement velocities of the respective actuators 11-1, 11-2, 11-3, 71 from becoming excessively large. Setting the predetermined velocity threshold to a rated velocity of the respective actuators 11-1, 11-2, 11-3, 71 makes it possible not only to prevent the entire work device from abruptly operating at high velocity, but also to prevent failure of the actuators.

FIG. 6 shows a flow of switching the movement velocities of the respective actuators 11-1, 11-2, 11-3, 71, using the velocity threshold Th2, as described above. The work-point movement velocity V1 is set as the target velocity (step W1), and the time required for operating at the work-point movement velocity V1 is calculated from the work-point movement distance (coordinate movement distance L) (step W2). Further, the movement velocities $V_{act}$ are calculated from the movement amounts of the respective actuators 11-1, 11-2, 11-3, 71 (step W3).

For all the actuators 11-1, 11-2, 11-3, 71, it is determined whether the condition that movement velocity $V_{act} \leq Th2$ is satisfied (step W4). When the condition is satisfied, the respective actuators 11-1, 11-2, 11-3, 71 are operated at the movement velocities $V_{act}$.

When the condition is not satisfied in determination step W4, the posture change velocity is set as the target velocity (step W5). In this case, the time required for operating at the posture change velocity is calculated from the posture change angle (step W6), and the movement velocities of the respective actuators 11-1, 11-2, 11-3, 71 are calculated (step W7).

Figure 7:
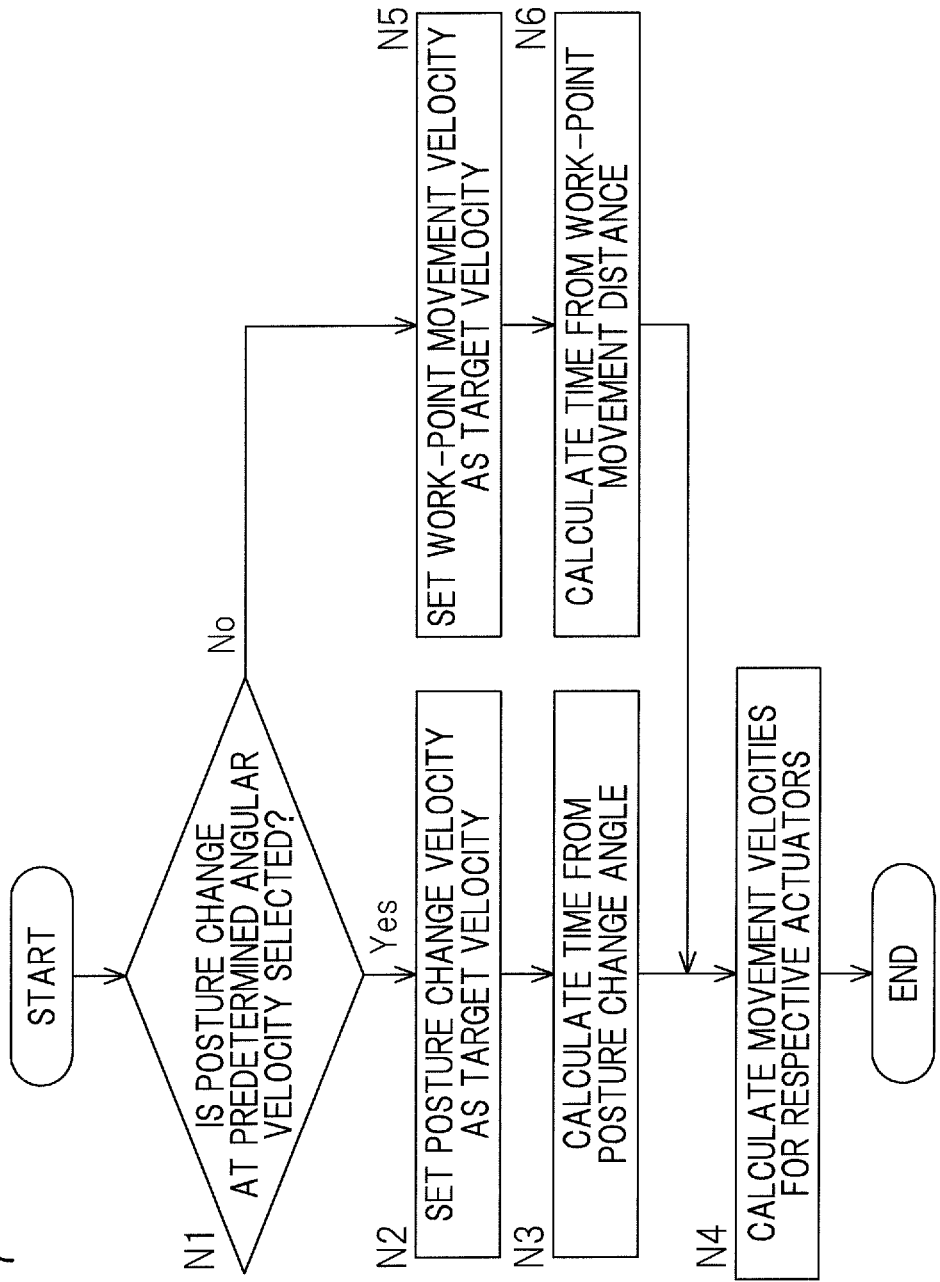
FIG. 7 is a flowchart showing an example of a control performed by a control device of a work device according to a fourth embodiment.

Fourth Embodiment, FIG. 7

There may be a switch 5 that is operable by an operator, and the controller 4 may be configured such that the work-point movement velocity and the posture change velocity can be arbitrarily switched through the switch 5 so as to switch the movement velocities of the respective actuators 11-1, 11-2, 11-3, 71. In that case, it is also possible to allow switching to be made for each work point Pi through the switch 5 and to store results of the switching for each work point Pi. This makes it possible to easily change the posture of the end effector 6, even where it is desired to change the posture at a predetermined angular velocity in the course of continuously moving the work point Pi.

FIG. 7 shows a flow of switching the movement velocities of the respective actuators 11-1, 11-2, 11-3, 71 through the switch 5.

First, it is determined whether it is selected to change the posture at the predetermined angular velocity, i.e., whether it is selected to use the posture change velocity through the switch 5 (step N1). When the condition is satisfied, the posture change velocity is set as the target velocity (step N2). Then, the time required for operating at the posture change velocity is calculated from the posture change angle (step N3), and the movement velocities of the respective actuators 11-1, 11-2, 11-3, 71 are calculated (step N4).

When it is determined that it is not selected to use the posture change velocity in step N1, the work-point movement velocity is set as the target velocity (step N5). Then, the time required for operating at the target velocity is calculated from the work-point movement distance (step N6), and the movement velocities of the respective actuators 11-1, 11-2, 11-3, 71 are calculated (step N4).

Effect and Advantage

According to the work device 1 of the first to fourth embodiments described above, the following effects and advantages are obtained.

The controller 4 includes the switching function unit 4a for switching the target velocity used for calculating the movement velocities of the respective posture control actuators 11-1, 11-2, 11-3 and the movement velocity of the combined-side actuator 71, to the work-point movement velocity and to the posture change velocity. This makes it possible to control the movement velocities of the respective actuators 11-1, 11-2, 11-3, 71 even where the work point P of the end effector 6 is not moved, while only the posture of the end effector 6 is changed.

As in the second embodiment, where the movement distance threshold Th1 is predefined, and the movement distance of the work point P falls within the movement distance threshold Th1, the movement velocities of the respective actuators 11-1, 11-2, 11-3, 71 can be calculated from the posture change velocity, instead of the work-point movement velocity. In this case, even where the work point P of the end effector 6 is moved at a minor extent, while the posture of the end effector 6 is greatly moved, the velocity for changing the posture of the end effector 6 does not become excessively large, making it possible to prevent the entire work device 1 from abruptly operating at high velocity. Therefore, even a less-experienced operator can easily operate the work device 1.

As in the third embodiment, where the movement velocities $V_{act}$ of the respective actuators 11-1, 11-2, 11-3, 71 calculated from the work-point movement velocity exceed the rated velocity Th2 of the actuators 11-1, 11-2, 11-3, 71, the movement velocities of the respective actuators 11-1, 11-2, 11-3, 71 can be calculated from the posture change velocity, instead of the work-point movement velocity. In that case, it is possible not only to prevent the entire work device 1 from abruptly operating at high velocity, but also to prevent failure of the respective actuators 11-1, 11-2, 11-3, 71.

As in the fourth embodiment, provision of the switch 5 that can be arbitrarily operated by an operator makes it possible to change the target velocity to the posture change velocity, even where movement of the work point P of the end effector 6 does not fall within the movement distance threshold Th1. Thus, since the operator can arbitrarily switch the work-point movement velocity and the posture change velocity, it is possible to operate the work device at a constant posture change velocity in a certain section, even when the work point P is continuously moved.

Hereinafter, other embodiments will be described with reference to FIG. 8 to FIG. 12. The following embodiments have the same features as those of the first embodiment, unless otherwise specifically described.

Fifth Embodiment

Figure 8:
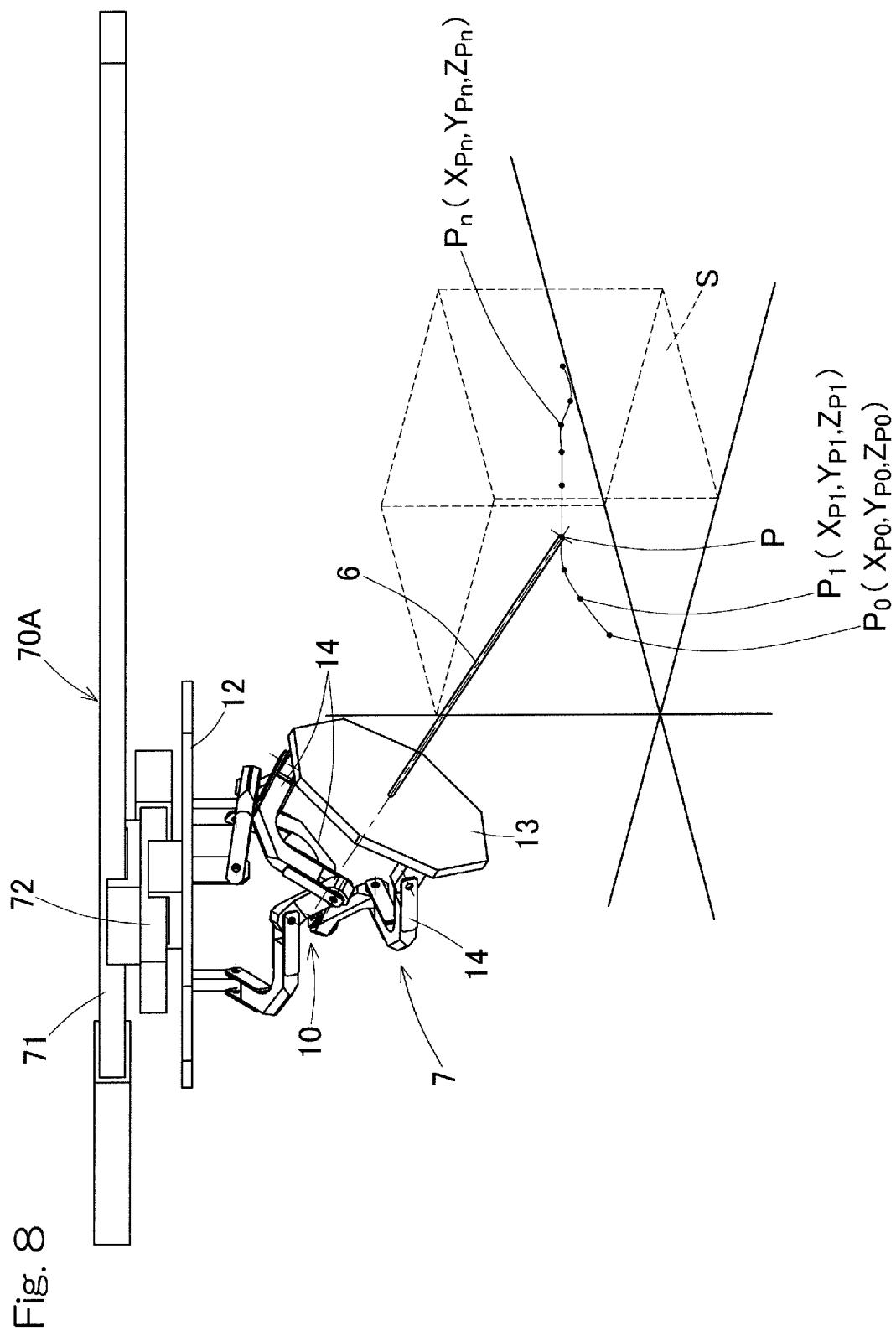
FIG. 8 is a perspective view of a work device using a parallel link mechanism according to a fifth embodiment.

FIG. 8 shows a fifth embodiment. Although in the first embodiment, description is made as to an example in which the combined mechanism 70 is configured as a single-axis linear actuator, in FIG. 8, a double-axis combined mechanism 70A, in which two actuators 71, 72 of linear motion type are orthogonally arranged, is combined with the link actuation device 7. The work device 1 of the fifth embodiment also includes a similar control device 2 (FIG. 1) to that of the first embodiment. It should be noted that this control device 2 according to the fifth embodiment is configured to control the respective actuators 71, 72 of the combined mechanism 70A.

Where the work point P of the end effector 6 is moved at a minor extent, while the posture of the end effector 6 is greatly changed, operation at the predetermined work-point movement velocity for continuously moving the work point P of the end effector 6 may result in an excessively high velocity for changing the posture of the end effector 6, possibly causing the entire work device 1 to abruptly move at high velocity. However, by switching the target velocity from the work-point movement velocity to the posture change velocity and calculating the movement velocities of the respective actuators 11-1, 11-2, 11-3, 71, 72, it is possible, also in the fifth embodiment, to prevent the entire work device 1 from abruptly operating at high velocity.

Sixth Embodiment

Figure 9:
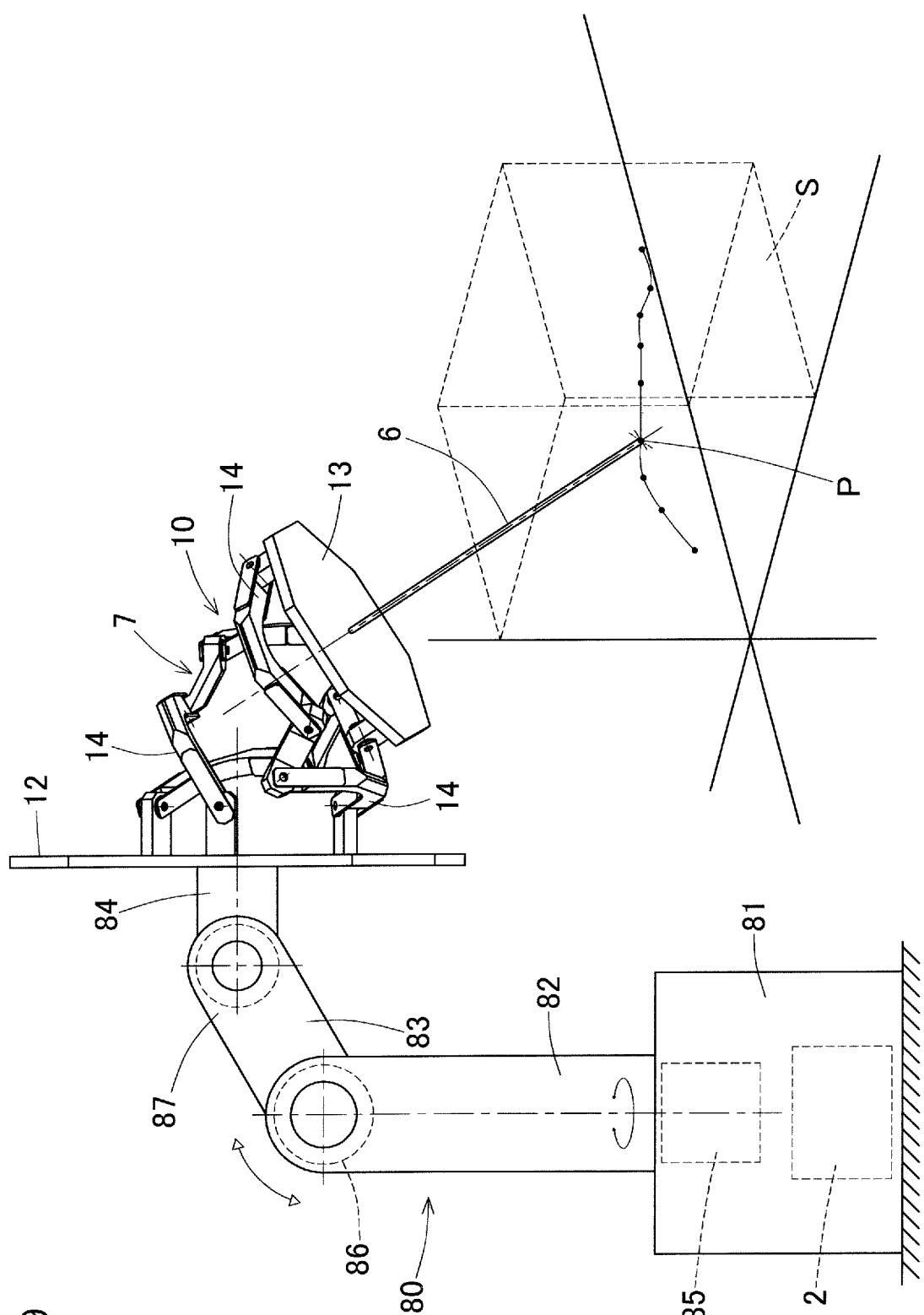
FIG. 9 is a perspective view of a work device using a parallel link mechanism according to a sixth embodiment.

FIG. 9 shows a sixth embodiment. In the sixth embodiment, a combined mechanism 80 to be combined with the link actuation device 7 is a vertical articulated robot. The combined mechanism 80 according to the sixth embodiment includes a first arm 82 configured to be driven by a first actuator 85, a second arm 83 configured to be driven by a second actuator 86, and a third arm 84 configured to be driven by a third actuator 87.

The first arm 82 is mounted on a base unit 81 so as to extend vertically upward and is rotatable about a vertical axis. The second arm 83 has a proximal end mounted at a distal end (upper end) of the first arm 82 so as to be turnable about a horizontal axis. The third arm 84 has a proximal end mounted at a distal end of the second arm 83 so as to be turnable about the horizontal axis. In the sixth embodiment, the second arm 83 and the third arm 84 have parallel rotation axes to each other.

The third arm 84 has a distal end at which the link actuation device 7 is mounted. The first to third actuators 85-87 constitute combined-side actuators that are different from the link actuation device 7. The sixth embodiment also includes a control device 2 similar to that of the work device 1 according to the first embodiment. It should be noted that this control device 2 according to the sixth embodiment is configured to control the respective actuators 85-87 of the combined mechanism 80.

Also in this configuration, where the work point P of the end effector 6 is moved at a minor extent, while the posture of the end effector 6 is greatly changed, operation at the predetermined work-point movement velocity for continuously moving the work point P of the end effector 6 may result in an excessively high velocity for changing the posture of the end effector 6, possibly causing the entire work device 1 to abruptly move at high velocity. However, by switching the target velocity from the work-point movement velocity to the posture change velocity and calculating the movement velocities of the respective actuators 11-1, 11-2, 11-3, and 85 to 87, it is possible to prevent the entire work device 1 from abruptly operating at high velocity.

Seventh Embodiment

Figure 10:
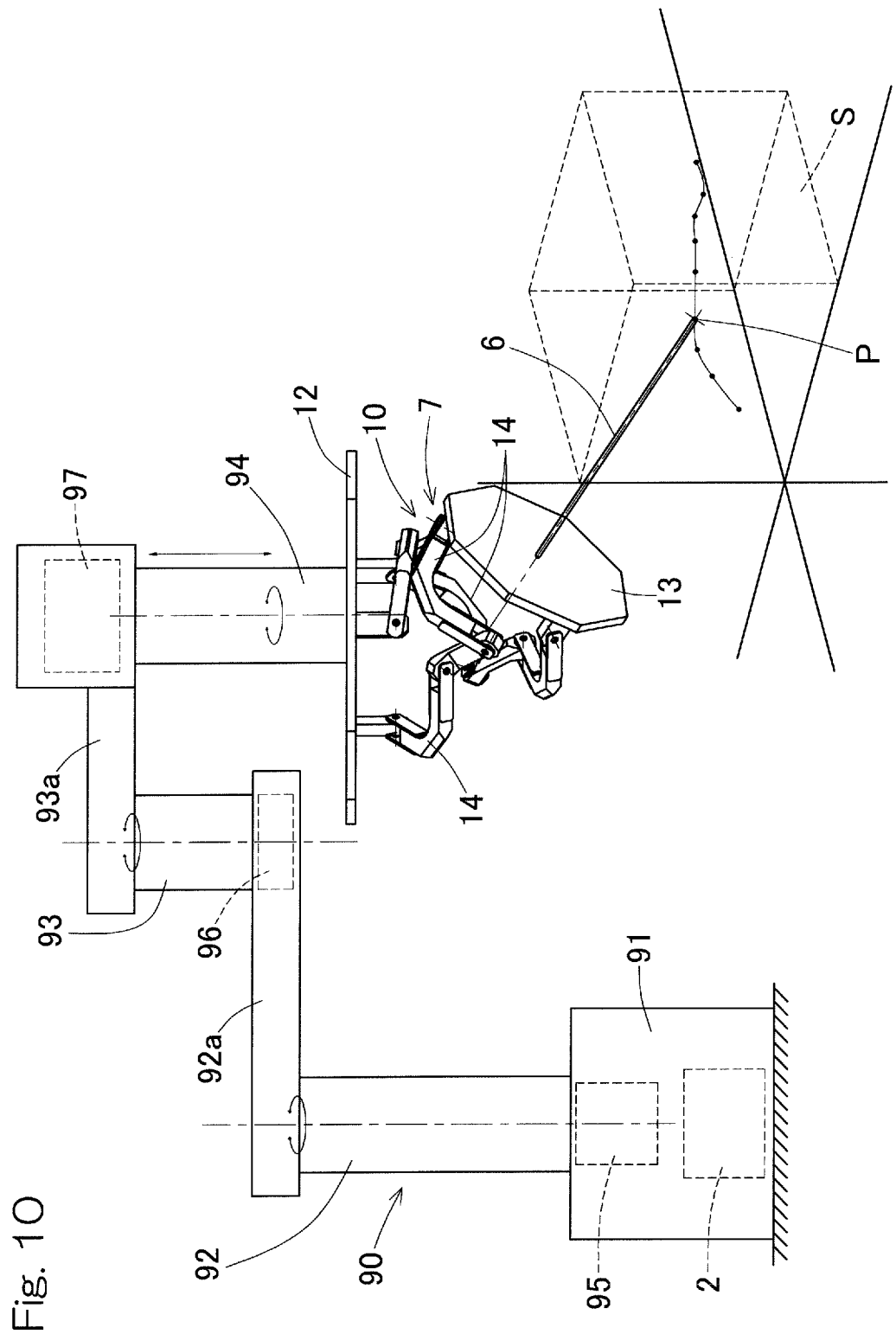
FIG. 10 is a perspective view of a work device using a parallel link mechanism according to a seventh embodiment.

FIG. 10 shows a seventh embodiment. In the seventh embodiment, a combined mechanism 90 to be combined with the link actuation device 7 is a horizontal articulated robot. The combined mechanism 90 according to the seventh embodiment includes a first arm 92 configured to be turnably driven by an actuator 95, a second arm 93 configured to be turnably driven by an actuator 96, and a third arm 94 configured to be moved upward and downward by a linear actuator 97. The actuators 95, 96 and the linear actuator 97 constitute combined-side actuators for the link actuation device 7.

The first arm 92 is mounted on a base unit 91 so as to extend vertically upward and can be horizontally turned by the actuator 95. The first arm 92 has a horizontal arm part 92a at an upper end (distal end) thereof. The horizontal arm part 92a has a distal end to which a proximal end (lower end) of the second arm 93 is coupled. The second arm 93 is mounted so as to be moved rotatably about a vertical axis. The second arm 93 has a horizontal arm part 93a at an upper end (distal end) thereof. The horizontal arm part 93a has a distal end to which a proximal end (upper end) of the third arm 94 is coupled. The third arm 94 is configured as a linear motion mechanism that can be moved upward and downward. The third arm 94 has a distal end (lower end) to which the link actuation device 7 is attached.

A control device 2 according to the seventh embodiment has a similar configuration to that of the control device 2 of the work device 1 according to the first embodiment. It should be noted that this control device 2 according to the seventh embodiment is configured to control the respective actuators 95-97 of the combined mechanism 90.

Also in this configuration, where the work point P of the end effector 6 is moved at a minor extent, while the posture of the end effector 6 is greatly changed, operation at the predetermined work-point movement velocity for continuously moving the work point P of the end effector 6 may result in an excessively high velocity for changing the posture of the end effector 6, possibly causing the entire work device 1 to abruptly move at high velocity. However, by switching the target velocity from the work-point movement velocity to the posture change velocity and calculating the movement velocities of the respective actuators 11-1, 11-2, 11-3, and 95 to 97, it is possible to prevent the entire work device 1 from abruptly operating at high velocity.

Eighth Embodiment

Figure 11:
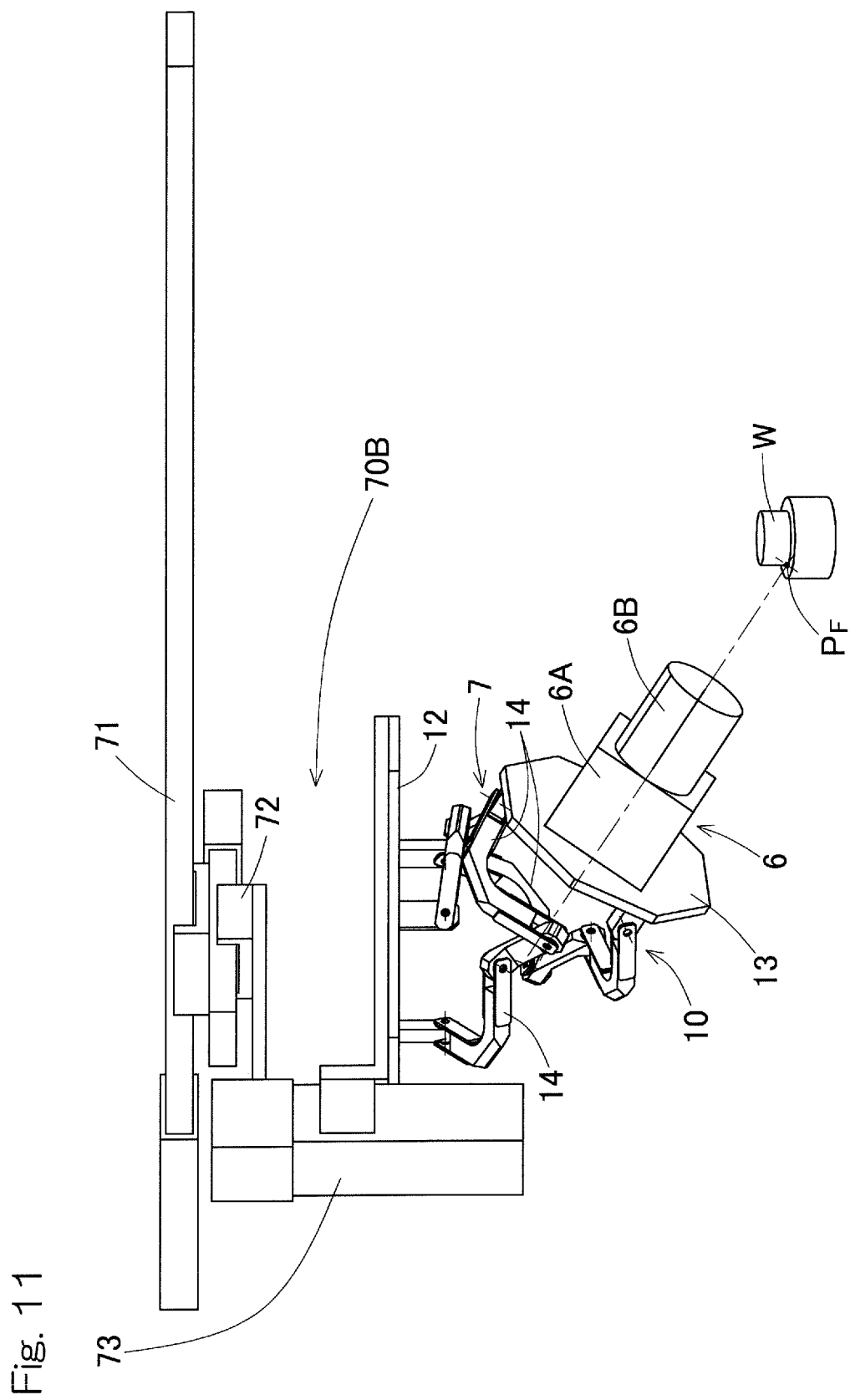
FIG. 11 is a perspective view of a work device using a parallel link mechanism according to an eighth embodiment.

FIG. 11 shows an eighth embodiment. A work device 1 of the eighth embodiment is an appearance inspection device and includes a camera 6A and a lens 6B as end effectors 6 mounted to the distal end of the link actuation device 7. The eighth embodiment employs a three-dimensional combined mechanism 70B in which three actuators 71-73 of linear motion type are combined so as to be orthogonal to each other. The link actuation device 7 is mounted to the third actuator 73 of linear motion type of the combined mechanism 70B.

In the case of the eighth embodiment, the work point of the end effector 6 is a focal point PF of the lens 6B. In the course of continuously capturing images of the appearance of a workpiece W, where a point to be inspected is fixed, and images are captured from multiple directions, use of the posture change velocity, instead of the work-point movement velocity, makes it possible to capture the images at a constant velocity.

Ninth Embodiment

Figure 12:
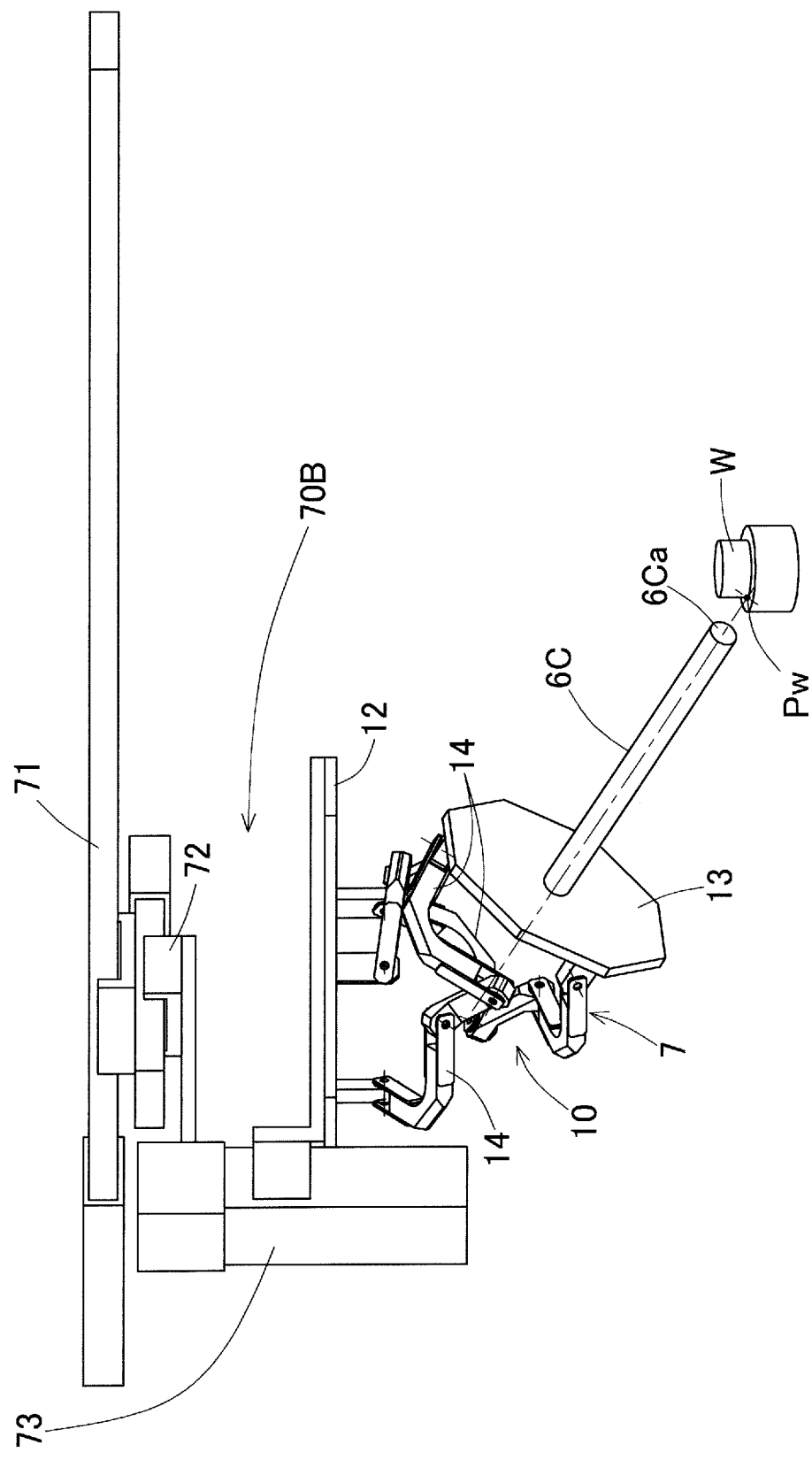
FIG. 12 is a perspective view of a work device using a parallel link mechanism according to a ninth embodiment.

FIG. 12 shows a ninth embodiment. A work device 1 of the ninth embodiment is a washing device and includes an air nozzle 6C as an end effector mounted at the distal end of the link actuation device 7. In the ninth embodiment, a combined mechanism 70B to be combined with the link actuation device 7 is constituted by first to third actuators 71, 72, 73 of linear motion type that are orthogonal to each other, in the same manner as in FIG. 11.

Where the invention is applied to a washing device, the work point is a washing point PW that is located on an axis of a nozzle port 6Ca of the air nozzle 6C and is separated by a predetermined distance. Where the washing point PW that is a point to be washed is fixed, and is washed from multiple directions, the posture change velocity can be used, instead of the work-point movement velocity, to wash the point at a constant velocity. Where the washing point PW moves, the work-point movement velocity can be used to effectively wash the point.

Tenth Embodiment

Figure 13:
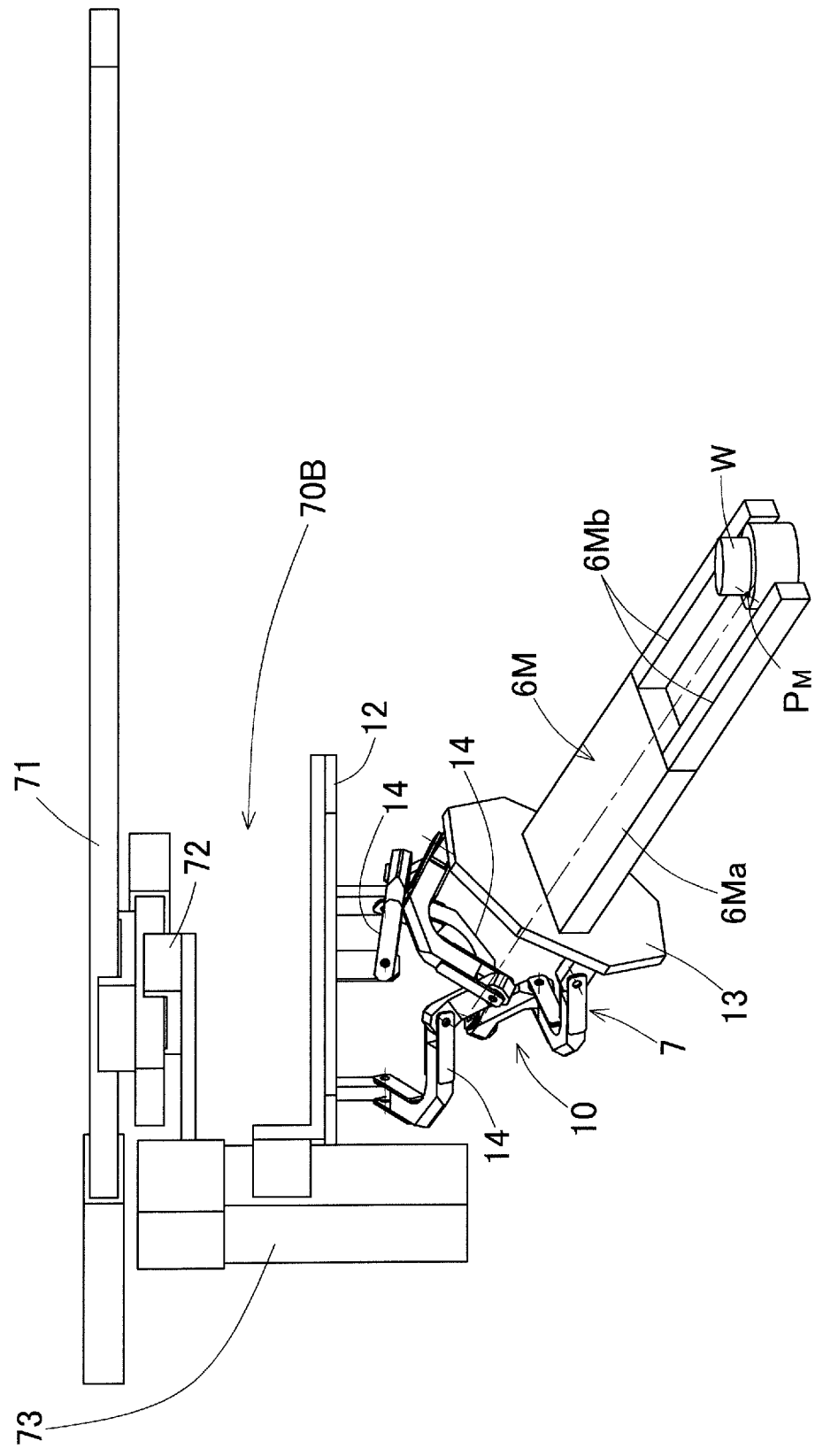
FIG. 13 is a perspective view of a work device using a parallel link mechanism according to a tenth embodiment.

FIG. 13 shows tenth embodiment. A work device 1 of the tenth embodiment is a manipulator and includes a clamping mechanism 6M as an end effector mounted to the distal end of the link actuation device 7. The clamping mechanism 6M includes a clamping mechanism main body 6Ma and a pair of chuck claws 6Mb, 6Mb protruding from the clamping mechanism main body 6Ma, the chuck claws 6Mb, 6Mb being configured to be opened and closed by a driving source (not illustrated). In the tenth embodiment, a combined mechanism 70B to be combined with the link actuation device 7 is constituted by first to third actuators 71, 72, 73 of linear motion type that are orthogonal to each other, in the same manner as in FIG. 11 and FIG. 12.

In the case of such a manipulator, the work point is a point PM of application of the clamping mechanism 6M. Where a workpiece W is rotated about the point PM of application while the workpiece W is clamped, the posture change velocity can be used, instead of the work-point movement velocity, to rotate the workpiece at a constant velocity. Where the workpiece W is moved, the work-point movement velocity can be used to effectively move the workpiece.

Eleventh Embodiment

FIG. 19 to FIG. 22B show an eleventh embodiment of the present invention. This work device 101 using a parallel link mechanism according to the eleventh embodiment includes a link actuation device 7, a single-axis combined-side actuator 71, an end effector 106, and a control device 102. The link actuation device 7 includes a parallel link mechanism 10 and posture control actuators 11 (11-1, 11-2, 11-3) for the parallel link mechanism 10. The combined-side actuators 71 constitute a combined mechanism 70 to be combined with the link actuation device 7.

The combined-side actuators 71 of the eleventh embodiment are the same as the combined-side actuators 71 of the first embodiment described with reference to FIG. 1 to FIG. 3. Therefore, the detailed description of the combined-side actuators 71 of the eleventh embodiment is omitted.

The link actuation device 7 of the eleventh embodiment is the same as the link actuation device 7 of the first embodiment described with reference to FIG. 14 to FIG. 18. Therefore, the detailed description of the link actuation device 7 of the eleventh embodiment is omitted.

Figure 19:
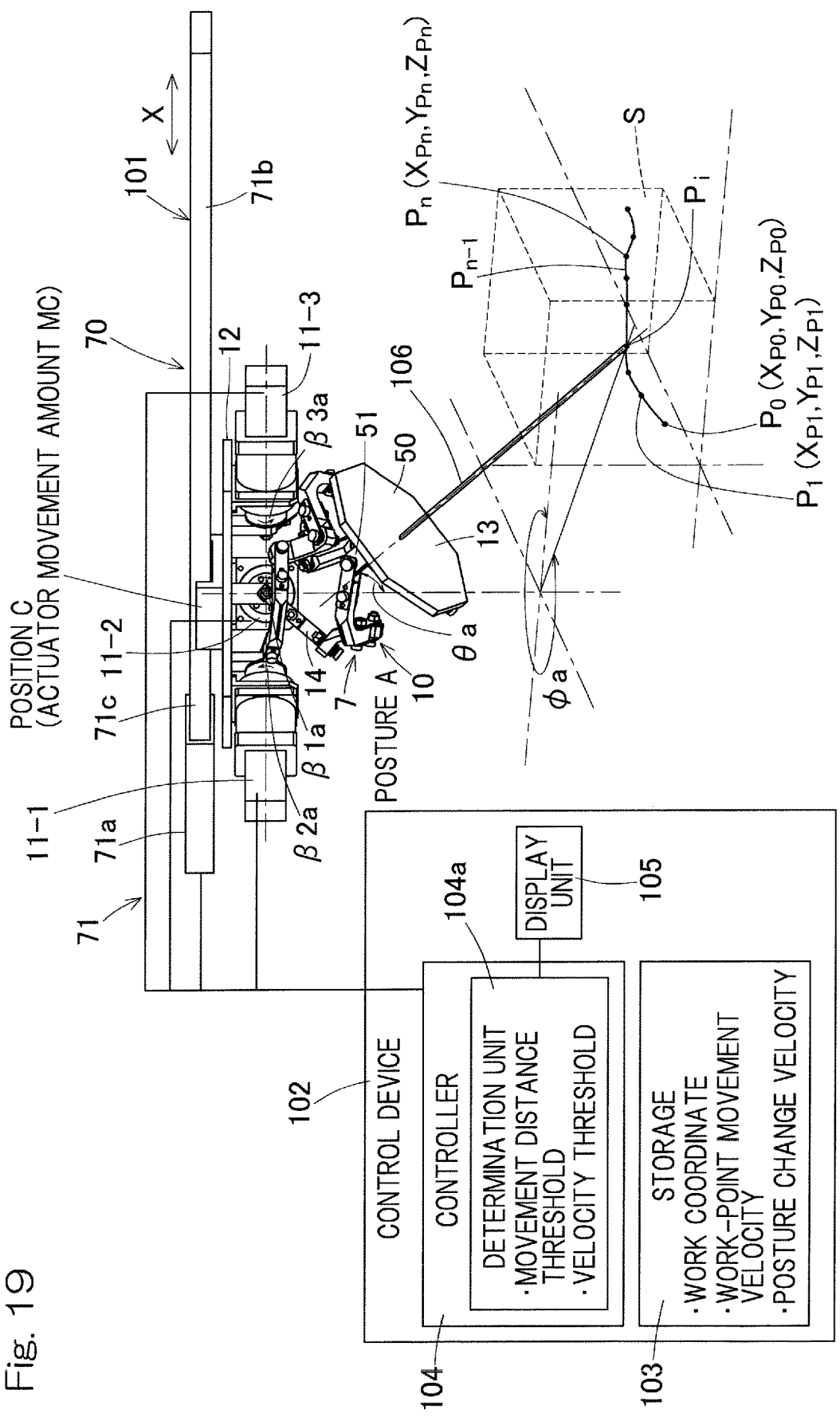
FIG. 19 shows a perspective view of a work device using a parallel link mechanism according to an eleventh embodiment of the present invention, in combination with a block diagram of a control device.
Figure 20:
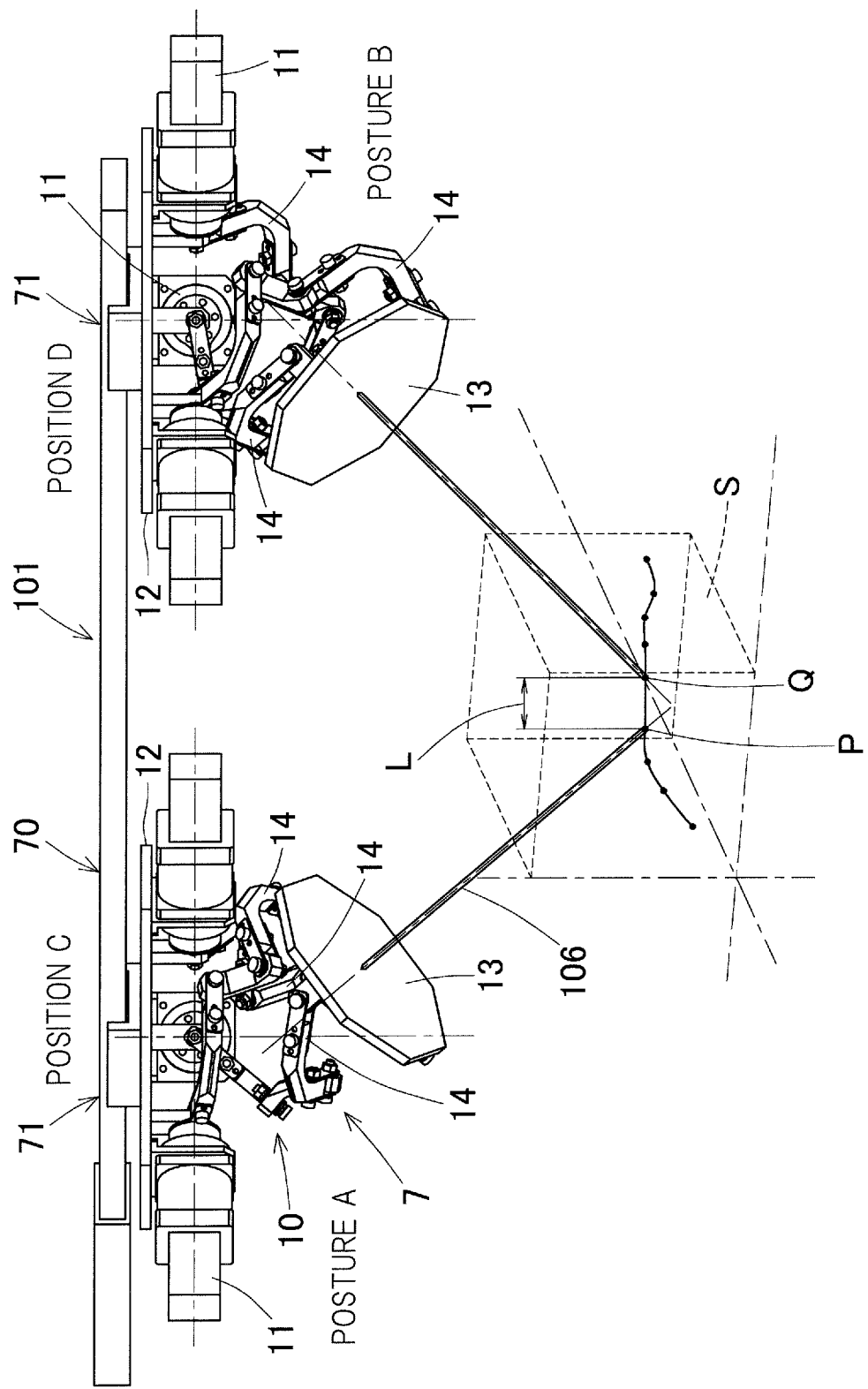
FIG. 20 illustrates an operation of the work device.
Figure 21:
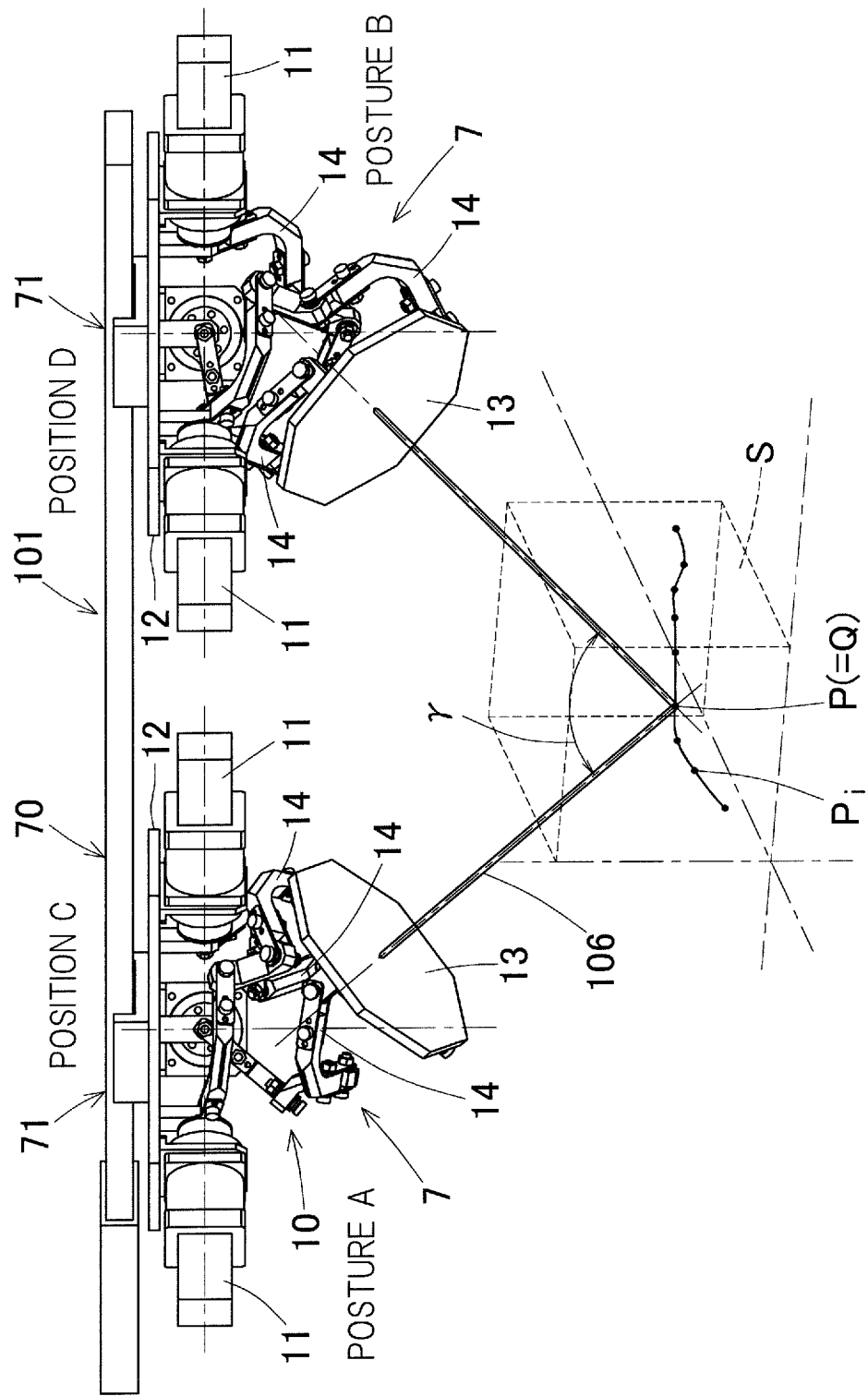
FIG. 21 illustrates another operation of the work device.

In FIG. 19, the end effector 106 is a device (for example, an application nozzle) that is mounted to the distal-end-side link hub 13 so as to protrude along the center axis QB and has a distal end as a work point P, in the same manner as that of the example shown in FIG. 1. The work point P of the end effector 106 may be separated from the distal end of the end effector 106 in an extension direction of the center axis QB.

The control device 102 controls the posture control actuators 11 (11-1 to 11-3) and the combined-side actuator 171. The control device 102 may include a computer, a program executed on the computer, and an electronic circuit. The control device 102 includes a storage 103, a controller 104, a display unit 105, and input unit (not illustrated). The controller 104 includes a determination unit 104a. The input unit is used to input setting of and/or to update stored content of the storage 103. The input unit may be a keyboard or a touch panel on the display unit 105 that can be operated by an operator to perform input, or may be a means for performing input by reading a storage media or by data communication.

The storage 103 stores a plurality of work coordinates (XPi, YPi, ZPi) that are coordinates of individual work points Pi (i=0, 1, 2, 3, . . . ) within the work space S at which the end effector 106 carries out work as well as stores the work-point movement velocity and the posture change velocity.

The controller 104 calculates a movement amount of each of the posture control actuators 11 and the combined-side actuator 171 and a distance between the work coordinates from the work coordinates stored in the storage 103, and calculates movement velocities of the respective actuators 11, 171 from the predetermined target velocity. Further, the controller 104 operates the respective actuators 11, 171 with the movement amounts and at the movement velocities calculated for the respective actuators 11, 171.

The determination unit 104a determines whether or not the work device is operable using the movement velocities of the respective actuators 11, 171-173 calculated from the target velocity. Specifically, the determination unit 104a determines whether the movement velocities of all the actuators 11, 171-173 calculated from the target velocity is equal to or less than a predetermined velocity. The determination unit 104a determines that the work device is operable when the condition is satisfied and that the work device is inoperable when the condition is not satisfied. The "predetermined velocity" may be arbitrarily set depending on designs.

The display unit 105 displays whether the work device is operable or not according to a determination result from the determination unit 104a. The display unit 105 may be, for example, a liquid crystal display device that displays a content on a display and uses images, such as letters and/or marks etc., for displaying. It should be noted that the control device 102 may also have, in addition to the display unit 105, a notification unit (not illustrated) that notifies whether the work device is operable or not according to the determination result from the determination unit 104a, with a sound or the like.

The exemplary operation of the features of the eleventh embodiment is the same as that of the first embodiment described with reference to FIG. 1 to FIG. 3 and equations (1) to (4). Therefore, the detailed description of the exemplary operation of the features of the eleventh embodiment is omitted.

In the control device 102 of the eleventh embodiment, when an operator sets the work point P of the end effector 106, the posture of the link actuation device 7 and the work-point movement velocity during teaching etc., the determination unit 104a determines whether the work device is operable at a predetermined target velocity. When the determination unit 104a determines that the work device is not operable at the predetermined target velocity, the display unit 105 displays a warning. That is, there is a function of notifying an operator when the work device is not operable at the predetermined target velocity. This allows the operator to adjust the work point, the posture of the link, and/or the target velocity during teaching or parameter setting so as to prevent the entire work device from abruptly operating at high velocity.

Figure 22A:
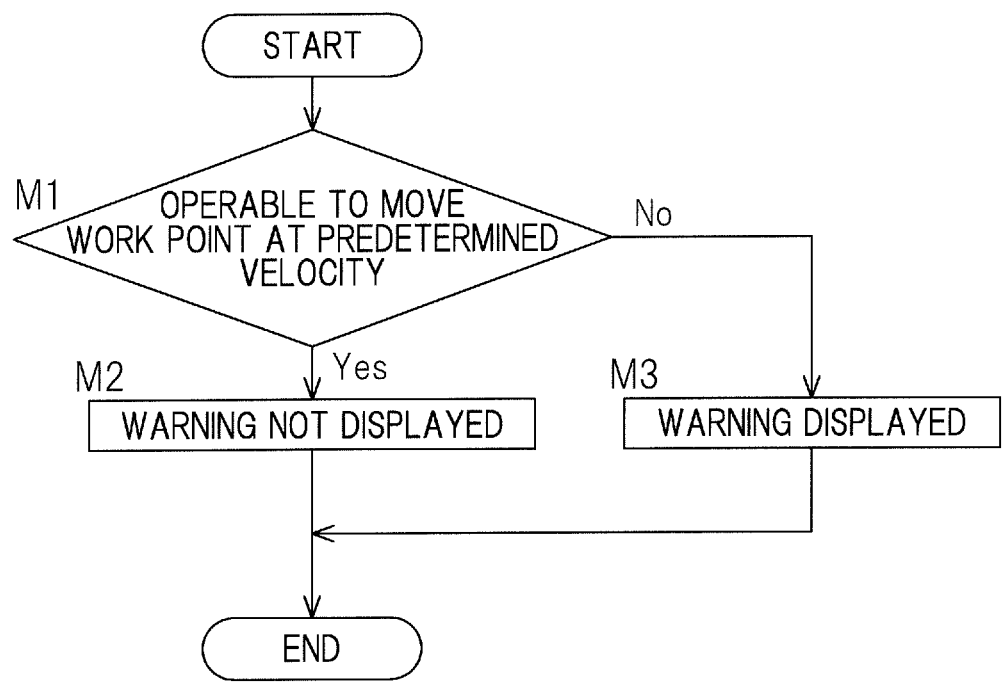
FIG. 22A is a flowchart showing an example of a control performed by the control device in the work device.
Figure 22B:
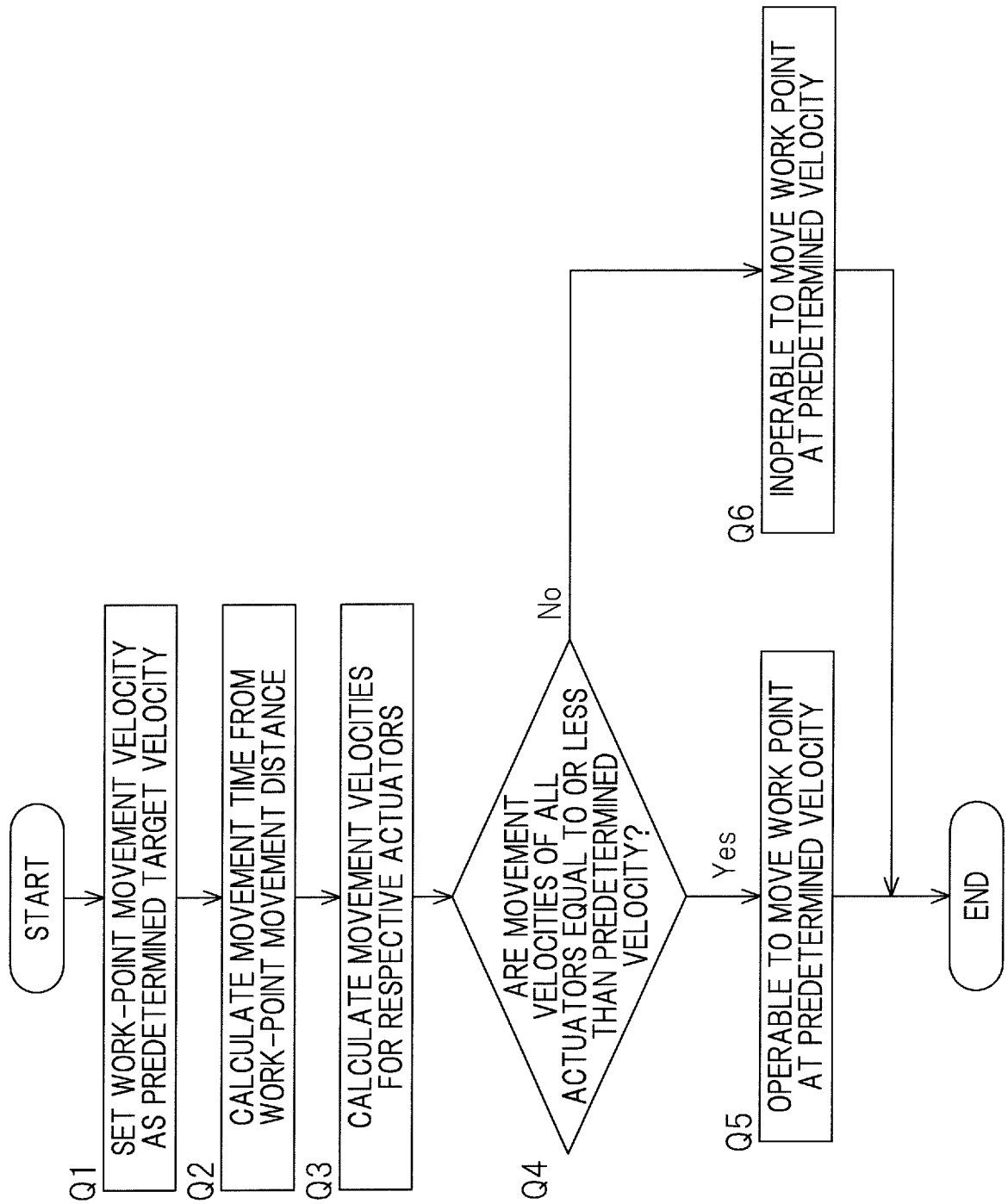
FIG. 22B is a flowchart showing details of a determination step in FIG. 22A.

FIG. 22A and FIG. 22B show flows of determination performed by the determination unit 104a of the controller 104 and displaying by the display unit 105.

The determination unit 104a determines whether the work device 101 is operable to move the work point P at the predetermined velocity, that is, whether the work device can be operated using the movement velocities of the respective actuators 11, 71-73 calculated from the target velocity (step M1). When it is determined that the work device is operable, the display unit 105 does not display a warning (step M2). When it is determined that the work device is not operable, the display unit 105 displays a warning (step M3).

FIG. 22B shows details of determination step M1 shown in FIG. 22A. Before starting the operation, an operator performs input to the input unit (not illustrated) to set the work-point movement velocity as the predetermined target velocity in the storage 3 (step Q1). After starting the operation, the controller 104 calculates movement time required for reaching the next work point P from the work-point movement velocity that has been set (step Q2) and calculates the movement velocities of the respective actuators 11-1, 11-2, 11-3, 71 (step Q3).

The determination unit 104a determines whether the movement velocities of all the actuator 11-1, 11-2, 11-3, 71 are equal to or less than a predetermined velocity (step Q4). The determination unit may be configured to determine whether only the movement velocities of the posture change actuators 11-1, 11-2, 11-3 are equal to or less than the predetermined velocity. The "predetermined velocity" is a threshold that is arbitrarily set for each of the actuators 11-1, 11-2, 11-3, 71. When the movement velocities are equal to or less than the predetermined velocity, it is determined that the work device is operable, that is, the work point can be moved at the predetermined velocity (step Q5). When the movement velocities are not equal to or less than the predetermined velocity, it is determined that the work device is inoperable, that is, the work point cannot be moved at the predetermined velocity (step Q6).

In this way, it is determined whether the work device is operable or not, and the display unit 105 displays a warning according to the determination result. Thus, an operator can take a suitable action, such as changing the target velocity to a lower value and adjusting the work point P, in accordance with the displayed content. As a result, only the posture of the end effector 106 is avoided from being changed without moving the work point P of the end effector 106, and therefore, it is possible to prevent the entire work device 101 from abruptly operating at high velocity.

Where work points of a plurality of end effectors are continuously moved at a constant velocity, if there is a section, in the course of such a movement, where tip positions of the end effectors are moved at a minor extent, while only the postures of the end effectors are greatly changed, time for the movement is shortened in that section because velocities of the tip positions are commanded. Thus, the entire work device may start abruptly operating at high velocity, as in the case of a singular posture of an articulated robot, possibly causing an overload to a motor.

In the controller 104 of the eleventh embodiment, however, the determination unit 104a determines whether the work device is operable using the movement velocities of the respective actuators 11, 71-73 calculated from the target velocity. According to the determination result of the determination unit 104a, the display unit 105 displays whether the work device is operable and displays a warning to an operator when it is inoperable. Thus, when the operator, viewing the displayed warning, can take a suitable action so as to prevent the entire work device from abruptly operating at high velocity.

Twelfth Embodiment

Figure 23:
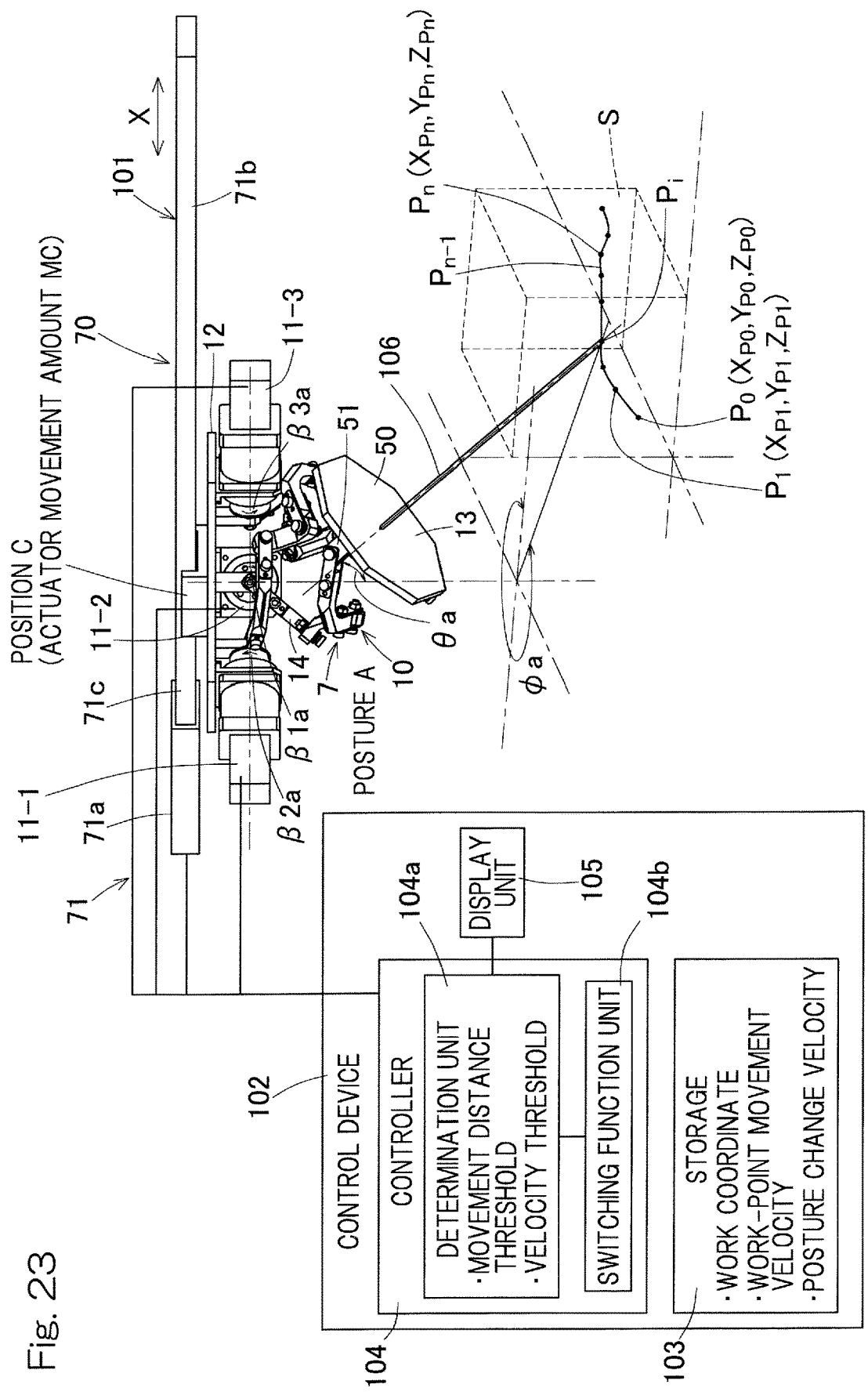
FIG. 23 shows a perspective view of a work device using a parallel link mechanism according to a twelfth embodiment, in combination with a block diagram of a control device.

FIG. 23 shows a twelfth embodiment. The twelfth embodiment additionally includes a switching function unit 104b in the controller 104 of the eleventh embodiment. The features of this twelfth embodiment are the same as those of the eleventh embodiment, unless otherwise specifically described. The switching function unit 104b switches the target velocity to the work-point movement velocity and to the posture change velocity. The switching function unit 104b of the twelfth embodiment is the same as the switching function unit 4a of the first embodiment and performs the processes described with the flows shown in FIG. 4 to FIG. 6.

Thirteenth Embodiment

Figure 24:
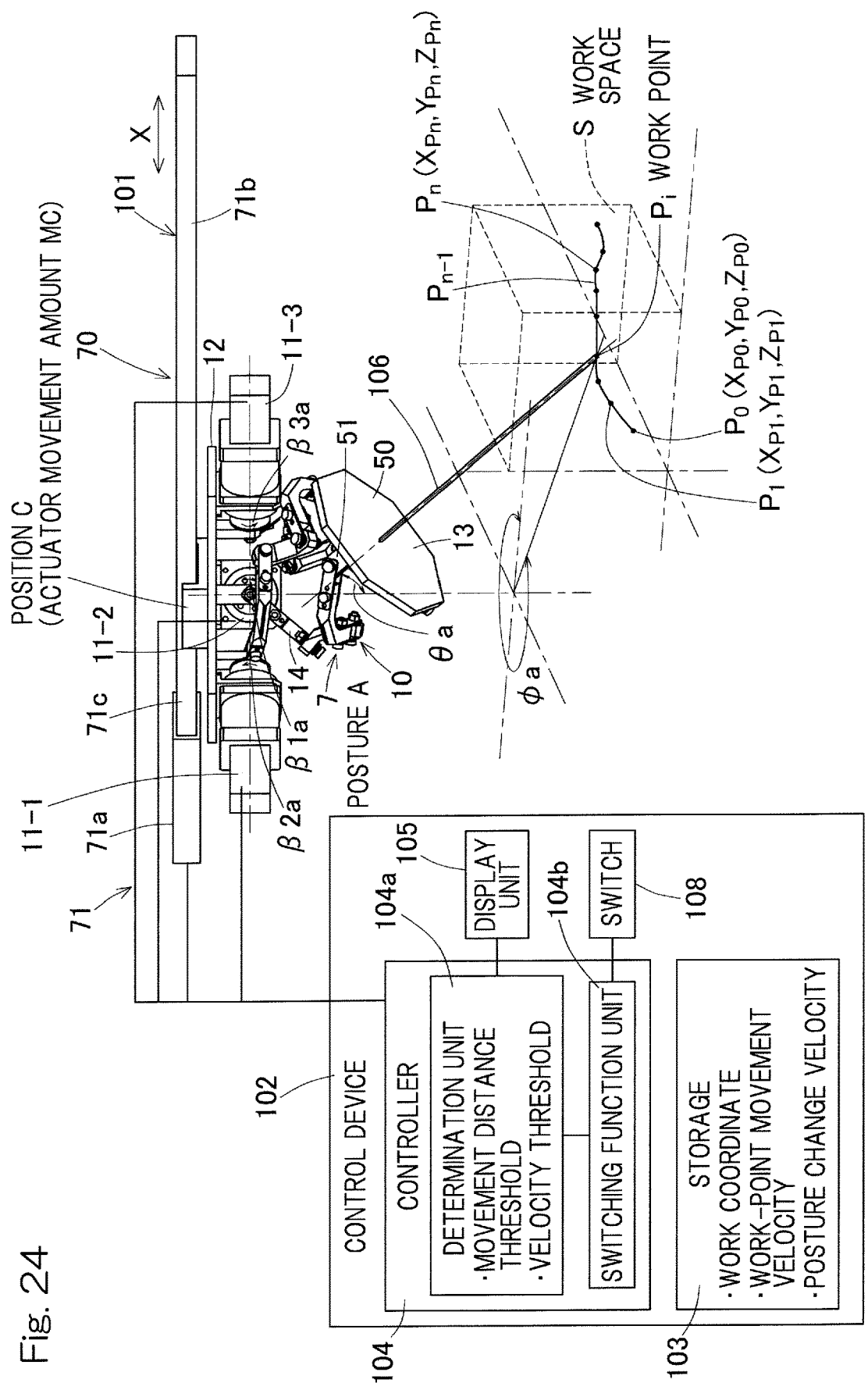
FIG. 24 shows a perspective view of a work device using a parallel link mechanism according to a thirteenth embodiment, in combination with a block diagram of a control device.

FIG. 24 shows a thirteenth embodiment. The thirteenth embodiment further includes a switch 108 provided to the control device 102 of the twelfth embodiment. The features of this thirteenth embodiment are the same as those of the eleventh embodiment and the twelfth embodiment, unless otherwise specifically described.

The switch 108 is an input operation unit that allows an operator to arbitrarily switch the target velocity to the work-point movement velocity and to the posture change velocity. The switch 108 of the thirteenth embodiment is the same as the switch 5 of the first embodiment and performs the process described with the flow shown in FIG. 7.

Effect and Advantage of Thirteenth and Thirteenth Embodiments

In addition to the effects of the work devices 1 of the eleventh embodiment, the work devices 101 according to the twelfth embodiment and the thirteenth embodiment can provide the following effects and advantages.

The switching function unit 104b of the controller 104 can switch the target velocity used for calculating the movement velocities of the respective posture control actuators 11-1, 11-2, 11-3 and the movement velocity of the combined-side actuator 71, to the work-point movement velocity and to the posture change velocity. This makes it possible to control the movement velocities of the respective actuators 11-1, 11-2, 11-3, 71, even where the work point P of the end effector 106 is not moved, and only the posture of the end effector 106 is changed.

Use of the flow of the second embodiment shown in FIG. 5 can obtain the same effects as those of the second embodiment described above. In addition, use of the flow of the third embodiment shown in FIG. 6 can provide the same effects as those of the third embodiment described above.

Further, provision of the switch 108 which can be arbitrarily switched by an operator, as in the thirteenth embodiment, makes it possible to change the target velocity to the posture change velocity, where movement of the work point P of the end effector 106 does not fall within the movement distance threshold. Thus, since the operator can arbitrarily switch the target velocity to to the work-point movement velocity and to the posture change velocity, it is possible to operate the device with a constant posture change velocity in a certain section, even where the work point P is continuously moved.

The control device 102 of the eleventh embodiment shown in FIG. 19, the control device 102 of the twelfth embodiment shown in FIG. 23, and the control device 102 of the thirteenth embodiment shown in FIG. 24 can also be applied to the work devices 1 of the fifth to tenth embodiments respectively shown in FIG. 8 to FIG. 13. In such a case, the same effects as those of the fifth to tenth embodiments can be obtained, in addition to the effects of the eleventh to thirteenth embodiments.

Variants of the present invention shown in FIG. 19 to FIG. 24 may include the following aspects 1 to 7.

Aspect 1

A work device 101 using a parallel link mechanism 10 according to an aspect 1 includes a link actuation device 7 having the parallel link mechanism 10. The parallel link mechanism includes: a proximal-end-side link hub 12; a distal-end-side link hub 13; and three or more link mechanisms 14 each coupling the distal-end-side link hub 13 to the proximal-end-side link hub 12 such that a posture of the distal-end-side link hub 13 can be changed relative to the proximal-end-side link hub 12. Each of the link mechanisms 14 includes: a proximal-side end link member having one end rotatably coupled to the proximal-end-side link hub 12; a distal-side end link member having one end rotatably coupled to the distal-end-side link hub 13; and an intermediate link member having opposite ends rotatably coupled to other ends of the proximal-side and distal-side end link members. The link actuation device 7 further includes posture control actuators 11 (11-1, 11-2, 11-3) provided to two or more link mechanisms 14 of the three or more link mechanisms 14 and configured to change the posture of the distal-end-side link hub 13 relative to the proximal-end-side link hub 12.

The work device 101 further includes:
an end effector 106 attached to the distal-end-side link hub 13;
a single-axis or multi-axis combined-side actuator 71-72, 85-87, 95-97 combined with the link actuation device 7 and configured to relatively change a work point P of the end effector 106 and a reference position of the link actuation device 7; and
a control device 102 configured to control the posture control actuators 11 and the combined-side actuator 71-72, 85-87, 95-97.

In this work device 101, the control device 102 includes:
a storage 103 configured to store a plurality of work coordinates (XPi, YPi, ZPi) that are coordinates of individual work points Pi (i=0, 1, 2, . . . ) within a work space at which the end effector 106 carries out work; and
a controller 104 configured to calculate movement amounts of the respective actuators 11, 71-72, 85-87, 95-97 and distances between the work coordinates (XPi, YPi, ZPi) from the work coordinates (XPi, YPi, ZPi) stored in the storage 103 and to calculate movement velocities of the respective actuators 11, 71-72, 85-87, 95-97 using a predetermined target velocity of the end effector 106, so as to operate the respective actuators 11, 71-72, 85-87, 95-97 by the movement amounts and at the movement velocities calculated for the respective actuators 11, 71-72, 85-87, 95-97.

The controller 104 includes:
a determination unit 104a configured to determine whether the work device is operable at the movement velocities of the respective actuators 11, 71-72, 85-87, 95-97 calculated from the target velocity; and
the control device 102 includes a display unit 105 configured to display whether the work device is operable according to a determination result from the determination unit 104a.

Where work points P of a plurality of end effectors 106 are continuously moved at a constant velocity, if there is a section, in the course of such a movement, where tip positions of the end effectors are moved at a minor extent, while only the postures of the end effectors are greatly changed, time for the movement is shortened in that section because velocities of the tip positions are commanded. Therefore, the entire work device may start abruptly operating at high velocity, as in the case of a singular posture of an articulated robot, possibly causing an overload to the actuators 11 (11-1, 11-2, 11-3), such as motors.

According to aspect 1, the determination unit 104a of the controller 104 determines whether or not the work device is operable using the movement velocities of the respective actuators 11, 71-72, 85-87, 95-97 calculated from the target velocity. The display unit 105 displays whether the work device is operable or not according to the determination result from the determination unit 104a and displays a warning to an operator when it is not operable. The operator viewing the displayed warning can take a suitable action, such as changing the target velocity to a lower value or adjusting the work point P. In this way, only the posture of the end effector 106 is avoided from being changed without moving the work point P of the end effector 106, and therefore, it is possible to prevent the entire work device 101 from abruptly operating at high velocity.

The combined-side actuators 71-72, 85-87, 95-97 may be connected to a base of the link actuation device 7 so as to change a position of the link actuation device 7, or be connected to a distal end of the link actuation device 7 so as to be attached with the end effector 106 at a tip end thereof, or be configured to move an origin of the work space. The "predetermined target velocity of the end effector 106" is a target velocity that is set in order to continuously move the end effector 106 through coordinates within the work space at a constant velocity, and may be set to an arbitrary value.

Aspect 2

In aspect 1, the determination unit 104a may be configured to determine whether the movement velocities of all the actuators calculated from the target velocity are equal to or less than a predetermined velocity, to determine that the work device is operable when the condition is satisfied, and to determine that the work device is not operable when the condition is not satisfied. The "predetermined velocity" is a threshold that is arbitrarily set through a test or the like. According to aspect 2, determination of whether the work device is operable or not based on the movement velocities of all the actuators 11, 71-72, 85-87, 95-97 makes it possible to reliably determine whether the entire work device 101 is operable or not.

Aspect 3

In aspect 1 or aspect 2, the storage 103 may be configured to store, as the target velocity, a predetermined work-point movement velocity to be set for continuously moving the end effector between the work coordinates (XPi, YPi, ZPi) at a constant velocity and a posture change velocity to be set for changing a posture of the end effector 106 at a predetermined angular velocity, and the controller 104 includes a switching function unit 104b configured to switch the target velocity to the work-point movement velocity and to the posture change velocity.

According to aspect 3, provision of a switching function of the target velocity by the switching function unit 104b makes it possible to safely control the respective actuators 11, 71-72, 85-87, 95-97 when the work point P of the end effector 106 is not moved, while only the posture of the end effector 106 is changed, as well as to make an operator aware of the switching of the target velocity through a displayed warning.

The "work-point movement velocity" and the "posture change velocity" may be set to an arbitrary value.

Aspect 4

In aspect 3, the determination unit 104a may be configured to determine if it is necessary to switch the movement velocity depending on whether a movement distance of the end effector 106 exceeds a movement distance threshold, and the switching function unit 104b may be configured to set the target velocity to the work-point movement velocity when it is determined by the determination unit 104a that it is not necessary to switch the movement velocity and switch the target velocity to the posture change velocity when it is determined necessary to switch the movement velocity. A determination of being "above or below" may be made on the basis of whether a value is "equal to or greater than; or below" a threshold or "above (or exceeding); or equal to or less than" the threshold. A circumstance that the work point P of the end effector 106 is not moved or is moved at a minor extent is determined on the basis of whether the movement distance of the work point of the end effector 106 falls within the predefined "movement distance threshold."

Where the work point P of the end effector 106 is moved at a minor extent, while the posture of the end effector 106 is greatly changed, operation at the predetermined target velocity ("work-point movement velocity") for continuously moving the work point P of the end effector 106 may result in an excessively high velocity for changing the posture of the end effector 106, possibly causing the entire work device to abruptly move at high velocity. According to aspect 4, use of the movement distance threshold to automatically switch from the work-point movement velocity to the posture change velocity allows even a less-experienced operator to prevent the entire work device 101 from abruptly operating at high velocity.

Aspect 5

In aspect 3, the determination unit 104a may be configured to determine whether a condition is met or not in which at least one of the movement velocities of the respective actuators 11, 71-72, 85-87, 95-97 calculated from the work-point movement velocity exceeds a predetermined velocity threshold, and the switching function unit 104b may be configured to switch the target velocity for calculating the movement velocities of the respective actuators 11, 71-72, 85-87, 95-97 to the posture change velocity, when the determination unit 104a determines that the condition is met.

For example, as a method of automatically switching from the work-point movement velocity to the posture change velocity, the velocities may be automatically switched when the movement velocities of the respective actuators 11, 71-72, 85-87, 95-97 calculated from the work-point movement velocity exceed a rated velocity of the respective actuators 11, 71-72, 85-87, 95-97. This makes it possible not only to prevent the entire work device 101 from abruptly operating at high velocity, but also to prevent failure of the respective actuators 11, 71-72, 85-87, 95-97.

Aspect 6

In aspect 4 or aspect 5, determination of whether or not switching is necessary by the determination unit 104a and switching of the target velocity by the switching function unit 104b when it is determined that the switching is necessary may be carried out upon completion of setting a parameter. The "parameter" may be various values that are set prior to actually operating the work device 1 and may include, for example, a target velocity, a work-point movement velocity, a posture change velocity, a predetermined velocity, a movement distance threshold, and a work coordinate. The parameter is, for example, stored in the storage 103.

According to aspect 6, the timings, at which the determination by the determination unit 104a and the switching of the target velocity by the switching function unit 104b are performed, are limited to the time of completion of the parameter setting, not to during program operation, and thus, notification can be given to an operator before starting program operation. This makes it possible to prevent the device from stopping when a determination is made during program operation and the device becomes inoperable.

Aspect 7

Where the switching function unit 104b is provided in any one of aspects 1 to 6, there may be a switch 108 that allows an operator to arbitrarily switch the target velocity to the target velocity to the work-point movement velocity and to the posture change velocity. According to aspect 7, the operator can switch the target velocity to the posture change velocity, even where the movement distance of the work point of the end effector 106 does not fall within the movement distance threshold.

Although the preferred embodiments of the present invention have been described with reference to the drawings, the present invention is not limited to the embodiments described above, and various additions, modifications, or deletions may be made without departing from the scope of the invention. Accordingly, such variants are included within the scope of the present invention.

REFERENCE NUMERALS 1, 101 . . . work device
2, 102 . . . control device
3, 103 . . . storage
4, 104 . . . controller
4a, 104b . . . switching function unit
5, 108 . . . switch
6, 106 . . . end effector
6A . . . camera (end effector)
61B . . . lens (end effector)
6C . . . air nozzle (end effector)
6M . . . clamping mechanism (end effector)
7 . . . link actuation device
10 . . . parallel link mechanism
11, 11-1, 11-2, 11-3 . . . posture change actuator
12 . . . proximal-end-side link hub
13 . . . distal-end-side link hub
14 . . . link mechanism
15 . . . proximal-side end link member
16 . . . distal-side end link member
17 . . . intermediate link member
70, 70A, 70B . . . combined mechanism
71, 72, 73 . . . combined-side actuator
76 . . . rotation center
80, 90 . . . combined mechanism
85-87, 95-97 . . . combined-side actuator
104a . . . determination unit
105 . . . display unit
O . . . intersection
O1 . . . center axis of a revolute pair of a link hub and an end link member
O2 . . . center axis of a revolute pair of an end link member and an intermediate link member
Pi, P, Q . . . work point
QA . . . center axis of the proximal-end-side link hub
QB . . . center axis of the distal-end-side link hub

What is claimed is:

1. A work device using a parallel link mechanism, the work device comprising:
    a link actuation device including:
        the parallel link mechanism having: a proximal-end-side link hub; a distal-end-side link hub; and three or more link mechanisms each coupling the distal-end-side link hub to the proximal-end-side link hub such that a posture of the distal-end-side link hub can be changed relative to the proximal-end-side link hub, to each of the link mechanisms including: a proximal-side end link member having one end rotatably coupled to the proximal-end-side link hub; a distal-side end link member having one end rotatably coupled to the distal-end-side link hub; and an intermediate link member having opposite ends rotatably coupled to the other ends of the proximal-side and distal-side end link members; and
        posture control actuators provided to two or more link mechanisms of the three or more link mechanisms and configured to change the posture of the distal-end-side link hub relative to the proximal-end-side link hub;
    an end effector attached to the distal-end-side link hub;
    a single-axis or multi-axis combined-side actuator combined with the link actuation device and configured to relatively change a work point of the end effector and a reference position of the link actuation device; and
    a control device configured to control the posture control actuators and the combined-side actuator, wherein
    the control device includes:
        a storage configured to store a plurality of work coordinates that are coordinates of individual work points within a work space at which the end effector carries out work; and
        a controller configured to calculate movement amounts of the respective actuators and distances between the work coordinates from the work coordinates stored in the storage and to calculate movement velocities of the respective actuators using a predetermined target velocity of the end effector, so as to operate the respective actuators by the movement amounts and at the movement velocities calculated for the respective actuators,
    the storage stores, as the target velocity, a predetermined work-point movement velocity to be set for continuously moving the end effector between the work coordinates at a constant velocity and a posture change velocity to be set for changing a posture of the end effector at a predetermined angular velocity, and
    the controller includes a switching function unit configured to switch the target velocity to the work-point movement velocity and to the posture change velocity.

2. The work device using the parallel link mechanism as claimed in claim 1, wherein the switching function unit is configured to set the target velocity to the work-point movement velocity when a movement distance of the end effector is above a movement distance threshold and to the posture change velocity when the movement distance is below the movement distance threshold.

3. The work device using the parallel link mechanism as claimed in claim 1, wherein the switching function unit is configured to set the target velocity to the posture change velocity when at least one of the movement velocities of the respective actuators calculated from the work-point movement velocity satisfies a velocity condition of being above a velocity threshold and to the work-point movement velocity when the velocity condition is not satisfied.

4. The work device using the parallel link mechanism as claimed in claim 1, further comprising a switch that allows an operator to arbitrarily switch the target velocity to the work-point movement velocity and to the posture change velocity.

5. The work device using the parallel link mechanism as claimed in claim 1, wherein the controller includes a determination unit configured to determine whether the work device is operable or not, using the movement velocities of the respective actuators calculated from the target velocity, and
    the control device includes a display unit configured to display whether the work device is operable or not according to a determination result from the determination unit.

6. The work device using the parallel link mechanism as claimed in claim 5, wherein the determination unit is configured to determine whether the movement velocities of all the actuators calculated from the target velocity are equal to or less than a predetermined velocity and to determine that the work device is operable when the condition is met and that the work device is not operable when the condition is not met.

7. The work device using the parallel link mechanism as claimed in claim 5, wherein the determination unit is configured to determine if it is necessary to switch the movement velocity depending on whether a movement distance of the end effector exceeds a movement distance threshold, and the switching function unit is configured to set the target velocity to the work-point movement velocity when it is determined by the determination unit that it is not necessary to switch the movement velocity and switch the target velocity to the posture change velocity when it is determined necessary to switch the movement velocity.

8. The work device using the parallel link mechanism as claimed in claim 5, wherein the determination unit is configured to determine whether a condition is met or not in which at least one of the movement velocities of the respective actuators calculated from the work-point movement velocity exceeds a predetermined velocity threshold, and the switching function unit is configured to switch the target velocity for calculating the movement velocities of the respective actuators to the posture change velocity, when the determination unit determines that the condition is met.

9. The work device using the parallel link mechanism as claimed in claim 7, wherein determination of whether or not switching is necessary by the determination unit and switching of the target velocity by the switching function unit when it is determined that the switching is necessary are carried out upon completion of setting a parameter.

\* \* \* \* \*

UNITED STATES PATENT AND TRADEMARK OFFICE
CERTIFICATE OF CORRECTION

| | |
|---|---|
| PATENT NO. | : 11,247,333 B2 |
| APPLICATION NO. | : 16/809153 |
| DATED | : February 15, 2022 |
| INVENTOR(S) | : Naoki Marui et al. |

It is certified that error appears in the above-identified patent and that said Letters Patent is hereby corrected as shown below:

In the Claims

Column 27, Line 55:
Claim 1, before "each" delete "to".

Column 28, Line 4:
Claim 1, delete "work point" and insert --work-point--.

Signed and Sealed this
Twenty-sixth Day of April, 2022

Katherine Kelly Vidal
*Director of the United States Patent and Trademark Office*